(12) United States Patent
Kuo et al.

(10) Patent No.: US 11,487,079 B2
(45) Date of Patent: Nov. 1, 2022

(54) LENS ACTUATING APPARATUS, PERISCOPE PHOTOGRAPHING MODULE, AND PHOTOGRAPHING DEVICE

(71) Applicant: HUAWEI TECHNOLOGIES CO., LTD., Guangdong (CN)

(72) Inventors: Li-Te Kuo, Dongguan (CN); Yushun Wu, Dongguan (CN); Kuni Lee, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/207,345

(22) Filed: Mar. 19, 2021

(65) Prior Publication Data

US 2021/0208363 A1     Jul. 8, 2021

Related U.S. Application Data

(63) Continuation of application No. PCT/CN2019/128135, filed on Dec. 25, 2019.

(30) Foreign Application Priority Data

Dec. 26, 2018    (CN) .......................... 201811608417.0

(51) Int. Cl.
    *H04N 5/232*        (2006.01)
    *H04N 5/225*        (2006.01)
                 (Continued)

(52) U.S. Cl.
    CPC ............. *G02B 7/09* (2013.01); *G02B 27/646* (2013.01); *G03B 5/00* (2013.01); *G03B 13/36* (2013.01);
                 (Continued)

(58) Field of Classification Search
    CPC .......... G02B 7/09; G02B 27/646; G02B 7/08; G02B 7/04; G03B 5/00; G03B 13/36;
                 (Continued)

(56) References Cited

U.S. PATENT DOCUMENTS

| | | | |
|---|---|---|---|
| 2017/0285363 A1 | 10/2017 | Hu et al. | |
| 2018/0217475 A1* | 8/2018 | Goldenberg | ............. G03B 5/00 |
| 2018/0231793 A1 | 8/2018 | Jeong et al. | |
| 2018/0329276 A1* | 11/2018 | Hu | ......................... G03B 17/17 |

FOREIGN PATENT DOCUMENTS

| | | |
|---|---|---|
| CN | 105610295 A | 5/2016 |
| CN | 105980921 A | 9/2016 |

(Continued)

OTHER PUBLICATIONS

Extended European Search Report issued in European Application No. 19905977.5 dated Oct. 25, 2021, 10 pages.

(Continued)

*Primary Examiner* — Padma Haliyur

(74) *Attorney, Agent, or Firm* — Fish & Richardson P.C.

(57) ABSTRACT

The present disclosure relates to a lens actuating apparatus, a periscope lens module including the lens actuating apparatus, and a photographing device including the periscope lens module. Light enters a lens group after being reflected, where a direction of an optical axis of the lens group is different from a thickness direction of the photographing device to eliminate a limitation of a length of the direction of the optical axis of the lens group on a thickness of the photographing device, and implement thinness of the photographing device. A translation motor and an axis-moving motor are disposed on a holder of the lens actuating apparatus to implement focusing and anti-shake of the periscope lens module including an optical component and the lens actuating apparatus. The translation motor and the axis-moving motor are independent of each other.

19 Claims, 11 Drawing Sheets

(51) Int. Cl.
  *H02K 41/035* (2006.01)
  *G02B 7/09* (2021.01)
  *H02K 11/215* (2016.01)
  *G02B 27/64* (2006.01)
  *G03B 5/00* (2021.01)
  *G03B 13/36* (2021.01)

(52) U.S. Cl.
  CPC ....... *H02K 11/215* (2016.01); *H02K 41/0356* (2013.01); *H04N 5/2252* (2013.01); *H04N 5/23287* (2013.01); *G03B 2205/0023* (2013.01)

(58) Field of Classification Search
  CPC ...... G03B 2205/0023; G03B 2205/003; G03B 2205/0069; G03B 30/00; H02K 11/215; H02K 41/0356; H04N 5/2252; H04N 5/23287; H04N 5/2253; H04N 5/2254; H04N 5/23264
  See application file for complete search history.

(56) References Cited

FOREIGN PATENT DOCUMENTS

| | | |
|---|---|---|
| CN | 205942054 U | 2/2017 |
| CN | 107357114 A | 11/2017 |
| CN | 108333791 A | 7/2018 |
| JP | 6103023 B2 | 3/2017 |
| KR | 20180097228 A | 8/2018 |

OTHER PUBLICATIONS

Office Action issued in Chinese Application 201811608417.0 dated Oct. 26, 2020, 10 pages (with English translation).

PCT International Search Report and Written Opinion issued in International Application No. PCT/CN2019/128135 dated Mar. 23, 2020, 12 pages (partial English translation).

\* cited by examiner

LENS ACTUATING APPARATUS, PERISCOPE PHOTOGRAPHING MODULE, AND PHOTOGRAPHING DEVICE

CROSS-REFERENCE TO RELATED APPLICATIONS

This application is a continuation of international Application No. PCT/CN2019/128135, filed on Dec. 25, 2019, which claims priority to Chinese Patent Application No. 201811608417.0, filed on Dec. 26, 2018. The disclosures of the aforementioned applications are hereby incorporated by reference in their entireties.

TECHNICAL FIELD

This application relates to the field of electronic technologies, and in particular, to a lens actuating apparatus, a periscope photographing module including the lens actuating apparatus, and a photographing device.

BACKGROUND

A photographing device usually includes a lens group. Different lenses in the lens group refract different light, so that the light is reflected to an image sensor to perform imaging. To implement focusing and anti-shake to obtain a clear image, motors need to be disposed around the lens group, to drive the lens group to translate along a direction of an optical axis to perform focusing. Alternatively, two of motors around the lens group are symmetrically disposed, and different acting forces exerted by the symmetrically disposed two motors on the lens group are controlled, so that the lens group rotates within a plane perpendicular to a direction of an optical axis, to compensate for shake during photographing, thereby implementing anti-shake. In the prior art, motors that drive a lens group to translate and rotate are the same, and consequently, the lens group may translate and rotate separately only.

SUMMARY

This application provides a lens actuating apparatus, a periscope photographing module including the lens actuating apparatus, and a photographing device, to simultaneously implement translation and rotation of a lens group, and improve focusing and anti-shake efficiency to quickly obtain a clear image.

According to a first aspect, this application provides a lens actuating apparatus, configured to drive an optical component fastened to the actuating apparatus to move or rotate. The lens actuating apparatus includes a housing, a holder, a plurality of elastic members, a translation motor and an axis-moving motor. The holder is accommodated in the housing, the optical component is fastened to the holder, and the optical component is configured to change a propagation direction of light. All of the plurality of elastic members are connected between the housing and the holder and are disposed at intervals around a light incident axis of the optical component, to support the holder in the housing. Both the translation motor and the axis-moving motor are located between the housing and the holder, and the translation motor and the axis-moving motor each include a fastening part and a movable part that moves relative to the fastening part. One of the fastening part and the movable part of the translation motor is fastened to the holder and the other of the fastening part and the movable part of the translation motor is fastened to the housing, and the translation motor is configured to drive the holder to move in a translation direction relative to the housing. One of the driving part and the movable part of the axis-moving motor is fastened to the holder and the other of the driving part and the movable part of the axis-moving motor is fastened to the housing. The axis-moving motor is configured to cooperate with the plurality of elastic members to drive the holder to rotate around a rotation axis relative to the housing, and the rotation axis is parallel to the translation direction or perpendicular to the translation direction.

In this application, the translation motor and the axis-moving motor are disposed on the holder of the lens actuating apparatus, so that the translation motor is used to drive the optical component fastened to the holder to translate, so as to implement focusing and anti-shake of a photographing module including the optical component and the lens actuating apparatus; and the axis-moving motor is used to drive the optical component fastened to the holder to rotate, to drive the optical component located on the holder to perform axis moving, so as to compensate for shake generated when the photographing module including the optical component and the lens actuating apparatus performs photographing, and implement anti-shake of the photographing module. In this application, the translation motor and the axis-moving motor are independent of each other, so that the translation motor and the axis-moving motor can work simultaneously, can further drive the holder to translate and rotate simultaneously, and can simultaneously implement focusing and anti-shake of the optical component installed on the holder. In this way, control efficiency is higher to quickly obtain a clear image. In addition, in this application, the holder can rotate through cooperation between the axis-moving motor and the elastic members, with no need to dispose motors pairwise symmetrically around the holder, and with no need to control different driving forces of relative motors to the holder to implement rotation. In this way, a quantity of motors disposed around the holder can be reduced, and a volume occupied by the lens actuating apparatus can be decreased. In addition, because the quantity of motors is reduced, control on the motors can also be simplified and the control efficiency can be improved.

In some embodiments of this application, each of the elastic members is a two degree-of-freedom elastomer, an elastic coefficient in a first direction is less than an elastic coefficient in a second direction or an elastic coefficient in a third direction, the first direction, the second direction, and the third direction are respectively orthogonal, and the translation direction of the holder is parallel to the first direction.

In this application, because the elastic member is a two degree-of-freedom elastomer, to be specific, elastic coefficients of the elastic member in two of three orthogonal directions are less than an elastic coefficient of the elastic member in the other direction, the elastic member is more easily deformed in the two of the three orthogonal directions than in the other direction. Based on a requirement, elastic members with different degree-of-freedom directions are selected and used at different positions of the holder, so that when the axis-moving motor exerts a force on the holder, the holder rotates because elastic coefficients of the elastic members disposed at the different positions of the holder are different along a direction of the force exerted by the axis-moving motor on the holder. In this case, the holder rotates with no need to control different driving forces of the motors at the different positions of the holder on the holder. In this way, control on the axis-moving motor is simplified, efficiency is improved, and the holder can be prevented from rotating in a non-rotation direction or a non-translation direction.

In some embodiments of this application, the lens actuating apparatus further includes a plurality of position sensors, and the position sensors one-to-one correspond to the axis-moving motor and the translation motor. A position closed loop can be formed by disposing the position sensors that one-to-one correspond to the axis-moving motor and the translation motor. To be specific, an accurate position of the holder relative to the housing can be accurately learned of by using the position sensor, and control on the axis-moving motor and the translation motor is further instructed based on information obtained by the position sensor. In this way, accurate focusing and anti-shake of a lens are implemented. Specifically, in an embodiment of this application, the position sensor is a Hall (Hall) sensor.

In some embodiments of this application, the optical component includes a light incident surface and a light emergent surface that has an included angle with the light incident surface. The light incident surface has a light incident axis perpendicular to the light incident surface, and the light emergent surface has a light emergent axis perpendicular to the light emergent surface. The elastic member is sheet-shaped, and the light incident axis is parallel to a plane on which the elastic members are located.

The included angle exists between the light incident surface and the light emergent surface of the optical component. To be specific, the optical component can change the propagation direction of the light passing through the optical component. In addition, the plane on which the elastic members are located is parallel to the light incident axis, to be specific, the elastic member cannot be disposed along a direction of the light incident axis, to prevent the elastic member from increasing a thickness of the lens actuating apparatus along the direction of the light incident axis.

In some embodiments of this application, the light incident axis is perpendicular to the light emergent axis, the translation direction is parallel to the light emergent axis, and the rotation axis is perpendicular to both the light incident axis and the light emergent axis. When the lens actuating apparatus is applied to the photographing module, the lens actuating apparatus drives the optical component to move along the direction of the light emergent axis, so that a distance between the optical component and a photosensitive chip can be adjusted, to be specific, an imaging distance can be adjusted. In this way, focusing of the photographing module can be implemented. The rotation axis is perpendicular to both the light incident axis and the light emergent axis, so that the holder can drive the optical component to implement anti-shake along the direction of the light incident axis.

Specifically, in an embodiment, both the translation motor and the axis-moving motor are voice coil motors, and both the movable part of the translation motor and the movable part of the axis-moving motor are magnets and are fastened to the holder. Direction of an N pole and an S pole of the movable part of the translation motor are the same as a direction of the light emergent axis, and a direction from an N pole to an S pole of the movable part of the axis-moving motor is the same as a direction of the light incident axis.

The voice coil motor usually includes a magnet and a coil corresponding to the magnet. Different currents are input into the coil, to control a magnitude of a Lorentz force between the coil and the magnet, so as to control an acting force of driving the holder relative to the housing based on an actual requirement. In this embodiment, the direction from the N pole to the S pole of the movable part of the translation motor is the same as the direction of the light emergent axis, so that a direction of a Lorentz force between a magnet and a coil of the translation motor is the direction of the light emergent axis. The direction from the N pole to the S pole of the movable part of the axis-moving motor is the same as the direction of the light incident axis, so that a direction of a Lorentz force between a magnet and a coil of the axis-moving motor is the direction of the light incident axis.

In some other embodiments of this application, the light incident axis is perpendicular to the light emergent axis, and both the translation direction and the direction of the rotation axis are parallel to the light emergent axis. When the lens actuating apparatus is applied to the photographing module, the lens actuating apparatus drives the optical component to move along the direction of the light emergent axis, so that a distance between the optical component and a photosensitive chip can be adjusted, to be specific, an imaging distance can be adjusted. In this way, focusing of the photographing module can be implemented. The rotation axis is perpendicular to both the light incident axis and the light emergent axis, so that the holder can drive the optical component to implement anti-shake along a direction perpendicular to the light emergent axis and the light incident axis.

Specifically, in an embodiment, both the translation motor and the axis-moving motor are voice coil motors, and both the movable part of the translation motor and the movable part of the axis-moving motor are magnets and are fastened to the holder. A direction from an N pole to an S pole of the fastening part of the translation motor is perpendicular to the light emergent axis and the light emergent axis, and a direction from an N pole to an S pole of the fastening part of the axis-moving motor is the same as a direction of the light incident axis.

In this embodiment, the direction from the N pole to the S pole of the movable part of the translation motor is perpendicular to the light emergent axis and the light emergent axis, so that a direction of a Lorentz force between a magnet and a coil of the translation motor is perpendicular to the direction of the light emergent axis and the direction of the light incident axis. The direction from the N pole to the S pole of the movable part of the axis-moving motor is the same as the direction of the light incident axis, so that a direction of a Lorentz force between a magnet and a coil of the axis-moving motor is the direction of the light incident axis.

In some embodiments of this application, the holder includes a first surface and a second surface that are disposed oppositely, and a third surface connected between the first surface and the second surface, and the third surface is far away from the light emergent surface of the optical component. The axis-moving motors are symmetrically disposed on the first surface and the second surface, and the translation motor is located at the center of the third surface or the translation motors are symmetrically disposed on the first surface and the second surface. The translation motor and the axis-moving motor that are located on a same surface are arranged side by side along the direction of the light emergent axis.

In some other embodiments of this application, the holder includes a first surface and a second surface that are disposed oppositely, and a third surface connected between the first surface and the second surface, and the third surface is far away from the light emergent surface of the optical component, where the axis-moving motor is disposed at the center of the third surface, and the translation motors are symmetrically disposed on the first surface and the second surface.

The axis-moving motors are symmetrically disposed on the first surface and the second surface, and the translation motor is located at the center of the third surface or the translation motors are symmetrically disposed on the first surface and the second surface, or the axis-moving motor is disposed at the center of the third surface and the translation motors are symmetrically disposed on the first surface and the second surface, so that the holder can be driven to rotate around the rotation axis perpendicular to the first surface, and translate in a movement direction that is the direction of the light emergent axis. Both the axis-moving motors and the translation motors are symmetrically disposed on the first surface and the second surface, or the axis-moving motor and the translation motor are disposed at the center of the third surface, so that forces of the first surface and the second surface are the same, and deflection and torques caused by different forces on the first surface and the second surface can be prevented from being generated in a process of translation or rotation of the holder.

In some embodiments, the plurality of elastic members are symmetrically disposed on the first surface and the second surface.

The elastic members disposed on the first surface and the second surface each include a translation elastic member and a common elastic member. Both an elastic coefficient of the translation elastic member along the direction of the light emergent axis and an elastic coefficient of the translation elastic member along the direction of the rotation axis are less than an elastic coefficient of the translation elastic member along a direction of the light incident axis. An elastic coefficient of the common elastic member along the direction of the rotation axis is greater than an elastic coefficient of the common elastic member along the direction of the light incident axis and an elastic coefficient of the common elastic member along the direction of the light emergent axis. An elastic coefficient of the common elastic member along a direction parallel to the rotation axis is greater than an elastic coefficient of the translation motor along the direction parallel to the rotation axis.

The translation elastic member and the common elastic member are respectively disposed on two sides of the first surface and the second surface along the direction of the light emergent axis, the translation elastic member is far away from the third surface relative to the common elastic member, and the common elastic member is close to the third surface relative to the translation elastic member.

The translation elastic member is far away from the third surface relative to the common elastic member, and the common elastic member is close to the third surface relative to the translation elastic member, and the elastic coefficient of the common elastic member along the direction parallel to the rotation axis is greater than the elastic coefficient of the translation motor along the direction parallel to the rotation axis. Therefore, when the axis-moving motor exerts a force on the holder along the direction of the light incident axis, deformation of the translation elastic member along the direction of the light incident axis is less than deformation of the common elastic member along the direction of the light incident axis. In this way, rotation along the direction of the rotation axis perpendicular to the first surface is generated.

Specifically, in an embodiment, the translation elastic member and the common elastic member each include a plurality of etched arms that are disposed at intervals and head-to-tail connected, an extension direction of an etched arm of the translation elastic member is parallel to the light incident axis, and an extension direction of an etched arm of the common elastic member is perpendicular to the first surface, so that both the elastic coefficient of the translation elastic member along the direction of the light emergent axis and the elastic coefficient of the translation elastic member along the direction of the rotation axis are less than an elastic coefficient of the translation elastic member along the direction of the light incident axis, and the elastic coefficient of the common elastic member along the direction of the rotation axis is greater than the elastic coefficient of the common elastic member along the direction of the light incident axis and the elastic coefficient of the common elastic member along the direction of the light emergent axis.

For the embodiment which the axis-moving motor is disposed at the center of the third surface, and the translation motors are symmetrically disposed on the first surface and the second surface, the plurality of elastic members may be respectively located on two sides of the first surface and the second surface along the direction of the light emergent axis; and both an elastic coefficient of the elastic member along the direction of the light emergent axis and an elastic coefficient of the elastic member along the direction of the light incident axis are less than an elastic coefficient of the elastic member along a direction perpendicular to the light emergent axis and the light incident axis.

Because the axis-moving motor is disposed on the third surface, a force exerted by the axis-moving motor on a side of the third surface of the holder is greater than a force exerted on a side of the light emergent surface. When both the elastic coefficient of the elastic member along the direction of the light emergent axis and the elastic coefficient of the elastic member along the direction of the light incident axis are less than the elastic coefficient of the elastic member along the direction perpendicular to the light emergent axis and the light incident axis, rotation along the direction of the rotation axis perpendicular to the first surface is generated. In addition, both the elastic coefficient of the elastic member along the direction of the light emergent axis and the elastic coefficient of the elastic member along the direction of the light incident axis are less than the elastic coefficient of the elastic member along the direction perpendicular to the light emergent axis and the light incident axis. Therefore, the holder can translate along the direction of the light emergent axis, but movement of the holder along the direction perpendicular to the first surface is limited. The holder is prevented from moving along a direction in which the movement does not need to be performed, to implement accurate control on the movement of the holder.

Specifically, in an embodiment, the elastic members each include a plurality of etched arms that are disposed at intervals and head-to-tail connected, and an extension direction of an etched arm is perpendicular to the light incident axis and the light emergent axis, so that both the elastic coefficient of the elastic member along the direction of the light emergent axis and the elastic coefficient of the elastic member along the direction of the light incident axis are less than the elastic coefficient of the elastic member along the direction perpendicular to the light emergent axis and the light incident axis.

In some embodiments of this application, the magnet includes $2 \times n$ sub-magnets, where n is a natural number greater than 0. N poles or S poles of adjacent sub-magnets are opposite, each magnet is fastened with a position sensor, and the position sensor is located at a junction of two sub-magnets at the center of the magnet.

A magnetic field linear region is near the junction of the two sub-magnets at the center of the magnet, so that there is linear relationship between a position change and a magnetic field change. There is a poor linear relationship between another position and the magnetic field change, and a position detection effect is poor. Therefore, motion information such as a motion distance and a motion speed of the holder relative to the housing can be more accurately learned of when the position sensor is located at the junction of the two sub-magnets at the center of the magnet. Then, the motion information obtained by the position sensor is used to instruct the translation motor and the axis-moving motor to drive the holder to move, so as to obtain accurate focusing and anti-shake effects.

In some other embodiments of this application, the magnet is a single magnet, and a direction towards which an N pole of the magnet faces is opposite to a direction towards which an S pole of the magnet faces. The position sensor is fastened to the housing and faces a side face of the magnet, and the side face of the magnet is perpendicular to the direction towards which the N pole faces and the direction towards which the S pole of the magnet faces. When the magnet is a single magnet, the side face of the magnet is a magnetic field linear region, and a position change and a magnetic field change are in a linear relationship. Therefore, the position sensor is disposed towards the side face of the magnet.

In some other embodiments of this application, the optical component is a reflection plane and has a single optical axis, the elastic member is sheet-shaped, and the optical axis is perpendicular to a plane on which the elastic members are located.

The translation direction is parallel to a direction of the optical axis, and the direction of the rotation axis is perpendicular to the translation direction. In this way, when the lens actuating apparatus is applied to the photographing module, the holder can translate along the translation direction to implement focusing, and the holder can rotate by using the rotation axis as an axis to implement axis moving of the photographing module. In this way, shake is compensated and anti-shake is implemented.

In some embodiments, both the translation motor and the axis-moving motor are voice coil motors, and both the movable part of the translation motor and the movable part of the axis-moving motor are magnets and are fastened to the holder. A direction front an N pole to an S pole of the movable part of the translation motor is the same as the direction of the optical axis, and a direction from an N pole to an S pole of the movable part of the axis-moving motor is perpendicular to the direction of the optical axis. In this case, acting forces of the translation motor and the axis-moving motor on the holder can make the translation direction parallel to the direction of the optical axis, and make the direction of the rotation axis perpendicular to the translation direction.

In some embodiments, the holder includes side faces parallel to the optical axis, the translation motor and the axis-moving motor are arranged side by side along the direction of the optical axis, and both the translation motor and the axis-moving motor are built in the sides. Both the translation motor and the axis-moving motor are built in the side faces, so that the translation motor and the axis-moving motor can be as close to the center of the holder as possible, the translation motor can drive the holder to move along the direction of the optical axis without deflection, and the axis-moving motor can drive the holder to rotate along the direction that is of the rotation axis and that is perpendicular to the translation direction without generating deflection in another direction. In this way, movement of the holder is more accurate.

The side faces include a first side face and a second side face that are opposite, and a third side face connected between the first side face and the second side face, and both the translation motor and the axis-moving motor are built in the third side face.

The plurality of elastic members are symmetrically disposed on the first side face and the second side face.

The elastic members disposed on the first side face and the second side face each include a translation elastic member and a common elastic member. Both an elastic coefficient of the translation elastic member along the direction of the optical axis and an elastic coefficient of the translation elastic member along a direction parallel to the first side face are less than an elastic coefficient of the translation elastic member along a direction perpendicular to the first side face. Both an elastic coefficient of the common elastic member along the direction of the optical axis and an elastic coefficient of the common elastic member along the direction perpendicular to the first side face are less than an elastic coefficient of the common elastic member along the direction parallel to the first side face. An elastic coefficient of the common elastic member along the direction parallel to the first side face is greater than an elastic coefficient of the translation elastic member along the direction parallel to the first side face.

The translation elastic member and the common elastic member are respectively disposed on two sides of the first side face and the second side face along the direction of the optical axis, the translation elastic member is close to the reflection plane relative to the common elastic member, and the common elastic member is far away from the reflection plane relative to the translation elastic member.

The translation elastic member is close to the reflection plane relative to the common elastic member, the common elastic member is far away from the reflection plane relative to the translation elastic member, the translation motor has a relatively large elastic coefficient along the direction of the light incident axis, and the common elastic member has a relatively small elastic coefficient along the direction of the light incident axis. Therefore, when the axis-moving motor exerts a force on the holder along the direction parallel to the first side face, deformation of the translation elastic member along the direction parallel to the first side face is less than deformation of the common elastic member along the direction parallel to the first side face. In this way, rotation along the direction of the rotation axis perpendicular to the first side face is generated.

In an embodiment, the translation elastic member and the common elastic member each include a plurality of etched arms that are disposed at intervals and head-to-tail connected, an extension direction of an etched arm of the translation elastic member is perpendicular to the first side face, and an etched arm of the common elastic member is parallel to the first side face. In this way, both the elastic coefficient of the translation elastic member along the direction of the optical axis and the elastic coefficient of the translation elastic member along the direction parallel to the first side face are less than the elastic coefficient of the translation elastic member along the direction perpendicular to the first side face, and both the elastic coefficient of the common elastic member along the direction of the optical axis and the elastic coefficient of the common elastic member along the direction perpendicular to the first side face are less than the elastic coefficient of the common elastic member along the direction parallel to the first side face.

According to a second aspect, this application provides a periscope photographing module. The periscope photographing module includes a first reflector, a lens group, a photosensitive chip, and the lens actuating apparatus. Both the first reflector and the lens group are installed on a holder of the lens actuating apparatus. After being reflected by the first reflector, light passes through the lens group and is transmitted to the photosensitive chip. A translation motor and an axis-moving motor drive the first reflector and the lens group to move, to implement focusing or anti-shake. Specifically, the translation motor drives the first reflector and the lens group to move, to change a distance between the lens group and the photosensitive chip, so as to implement focusing. The axis-moving motor drives the first reflector and the lens group to rotate, to change a direction of an optical axis and compensate for shake of the photographing module, thereby implementing anti-shake.

In some embodiments of this application, one lens actuating apparatus is further disposed between the lens group and the photosensitive chip of the periscope photographing module, a second reflector is installed on the lens actuating apparatus between the lens group and the photosensitive chip, and the second reflector is configured to reflect the light passing through the lens group to the photosensitive chip. In addition, focusing and anti-shake are jointly implemented through translation and rotation of the lens actuating apparatus on which the second reflector is installed and the lens actuating apparatus on which the first reflector is installed.

In some embodiments of this application, one second reflector is further disposed between the lens group and the photosensitive chip of the periscope photographing module, and the second reflector is configured to reflect the light passing through the lens group to the photosensitive chip.

According to a third aspect, this application further provides another periscope photographing module. The periscope photographing module includes a first reflector, a lens group, a photosensitive chip, a second reflector, and the lens actuating apparatus. The second reflector is installed on a holder of the lens actuating apparatus, the first reflector is configured to reflect light to the lens group, the lens group is configured to transmit the light reflected by the first reflector to the second reflector, the second reflector is configured to transmit the light transmitted by the lens group to the photosensitive chip, and a translation motor and an axis-moving motor of the lens actuating apparatus drive the reflector and the lens group to move, to implement focusing or anti-shake.

According to a fourth aspect, this application provides a photographing device. The photographing device includes a housing, a control unit, and the periscope photographing module, and the periscope photographing module is installed in the housing. A light incident hole is disposed on the housing, light enters the periscope photographing module by using the light incident hole, and an optical axis of a lens group of the periscope photographing module crosses an axis of the light incident hole. The first reflector is located between the light incident hole and the lens group and is configured to reflect the light entering from the light incident hole to the lens group. A translation motor, an axis-moving motor, and a photosensitive chip all are electrically connected to the control unit. The control unit is configured to receive and analyze an image of the photosensitive chip to determine a proper corrected motion value and send a signal to a corresponding translation motor and/or a corresponding axis-moving motor, so that the translation motor and/or the axis-moving motor drive/drives a holder and an optical component installed on the holder to translate and/or rotate.

In this application, the optical axis of the lens group of the periscope photographing module crosses the axis of the light incident hole, and the light entering from the light incident hole is reflected to the lens group by using the first reflector. The light incident hole is generally disposed in a thickness direction of the photographing device. The optical axis of the lens group does not need to be disposed coaxially with an axial direction of the light incident hole, and therefore a size of the thickness direction of the photographing module can be prevented from being limited by a size of a direction of the optical axis of the lens group, thereby facilitating thinness of the photographing module. In addition, focusing and anti-shake of the periscope photographing module in the photographing module can make the photographing device obtain an image with better definition through photographing.

BRIEF DESCRIPTION OF DRAWINGS

To describe structural features and functions of this application more clearly, the following describes the structural features and the functions in detail with reference to accompanying drawings and specific embodiments.

DESCRIPTION OF EMBODIMENTS

Figure 1:
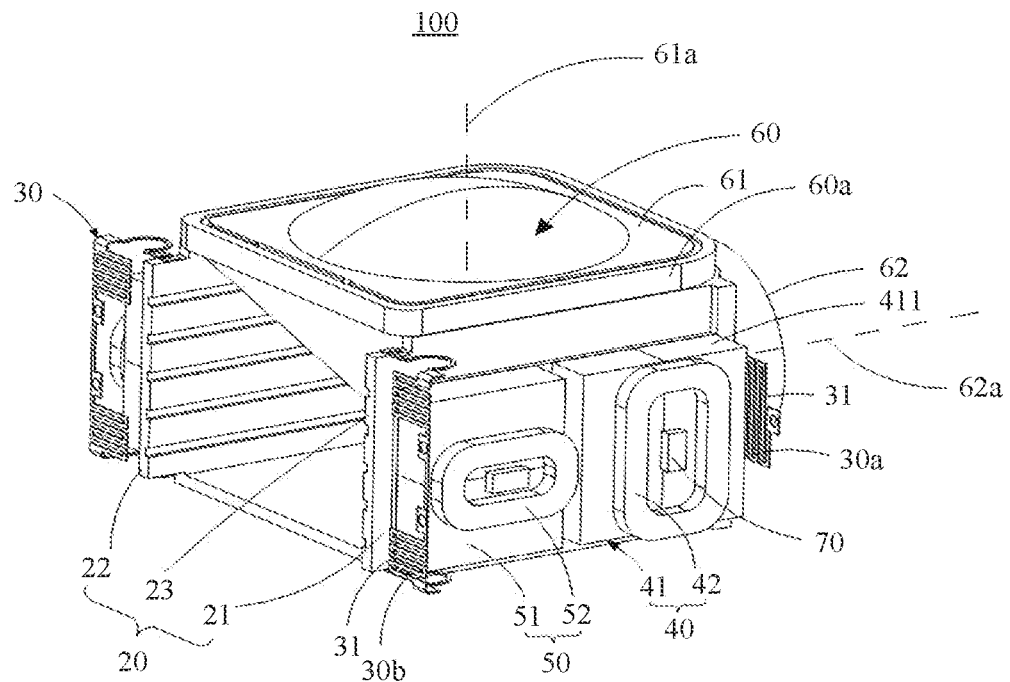
FIG. 1 is a schematic structural diagram of a lens actuating apparatus according to an embodiment of this application.

The following clearly describes the technical solutions in the embodiments of this application with reference to the accompanying drawings in the embodiments of this application.

In the descriptions of this application, it should be noted that, unless otherwise specified and limited, terms "installation", "connection", and "fastening" should be understood in a broad sense. For example, the "connection" may be a fixed connection, or may be a detachable connection, or an integrated connection; the "connection" may be a mechanical connection, or may be an electrical connection or mutual communication; the "connection" may be a direct connection, or may be an indirect connection by using an intermediate medium; or the "connection" may be an internal connection of two elements or an interaction relationship between two elements. The "fastening" may be direct fastening, or may be fastening by using an intermediate medium. The "installation" may be detachable installation or fixed installation, or may be direct installation or indirect installation by using an intermediate medium. For a person of ordinary skill in the art, specific meaning of the foregoing terms in this application may be understood depending on a specific situation.

This application provides a photographing device. The photographing device may be any electronic device that can be used for photographing, such as a mobile phone, a tablet, or a compact camera. The photographing device includes a photographing module, to perform photographing by using the photographing module. The photographing module includes a lens actuating apparatus, an optical component, and a photosensitive chip. The optical component is installed on the lens actuating apparatus. The lens actuating apparatus is configured to drive the optical component installed on the lens actuating apparatus to move or rotate, to implement focusing and anti-shake of the photographing module including the lens actuating apparatus and the optical component.

In this application, the lens actuating apparatus includes a housing, a holder, a plurality of elastic members, a translation motor, and an axis-moving motor. The holder is accommodated in the housing, the optical component is fastened to the holder, and the optical component refracts or reflects light to change a propagation direction of the light, so that the light is reflected to the photosensitive chip and a clear image is obtained. All of the plurality of elastic members are connected between the housing and the holder, are configured to support the holder in the housing, and provide motion space for a movement of the holder in the housing. Both the translation motor and the axis-moving motor are located between the housing and the holder, and the translation motor and the axis-moving motor each include a fastening part and a movable part that moves relative to the fastening part. One of the fastening part and the movable part of the translation motor is fastened to the holder and the other of the fastening part and the movable part of the translation motor is fastened to the housing. A relative movement of the fastening part and the movable part of the translation motor drives the holder to move in a translation direction relative to the housing. One of the driving part and the movable part of the axis-moving motor is fastened to the holder and the other of the driving part and the movable part of the axis-moving motor is fastened to the housing. The axis-moving motor is configured to cooperate with the plurality of elastic members to drive the holder to rotate around a rotation axis relative to the housing. In this application, the rotation axis is parallel to the translation direction or perpendicular to the translation direction.

In this application, the translation motor and the axis-moving motor are disposed on the holder of the lens actuating apparatus, so that the translation motor is used to drive the optical component fastened to the holder to translate, so as to implement focusing and anti-shake of the photographing module including the optical component and the lens actuating apparatus. The axis-moving motor is used to drive the optical component fastened to the holder to rotate, to drive the optical component located on the holder to perform axis moving, so as to compensate for shake generated when the photographing module including the optical component and the lens actuating apparatus performs photographing, and implement anti-shake of the photographing module. In this application, the translation motor and the axis-moving motor are independent of each other, so that the translation motor and the axis-moving motor can work simultaneously, can further drive the holder to translate and rotate simultaneously, and can simultaneously implement focusing and anti-shake of a lens. In this way, control efficiency is higher to quickly obtain a clear image. In addition, in this application, the holder can rotate through cooperation between the axis-moving motor and the elastic members, with no need to dispose motors pairwise symmetrically around the holder, and with no need to control different driving forces of relative motors to the holder to implement rotation. In this way, a quantity of motors disposed around the holder can be reduced, and a volume occupied by the lens actuating apparatus can be decreased. In addition, because the quantity of motors is reduced, control on the motors can also be simplified and the control efficiency can be improved.

In some embodiments of this application, each of the elastic members is a two degree-of-freedom elastomer. The two degree-of-freedom elastomer is an elastomer in which elastic coefficients of the elastic member in two of three orthogonal directions are less than an elastic coefficient of the elastic member in the other direction, so that the elastic member is more easily deformed in two of the three orthogonal directions than in the other direction. In this application, the translation direction of the holder is parallel to a first direction, and an elastic coefficient in the first direction is less than an elastic coefficient in a second direction or an elastic coefficient in a third direction. A direction of the rotation axis is parallel to the second direction, a value of the elastic coefficient in the second direction is different from a value of the elastic coefficient in the third direction, and an elastic coefficient of the elastic member in the second direction may be greater than an elastic coefficient of the elastic member in the third direction, or may be less than an elastic coefficient of the elastic member in the third direction. In this application, based on an actual requirement, elastic members with different degree-of-freedom directions are selected and used at different positions of the holder, so that when the axis-moving motor exerts a force on the holder, the holder rotates because the elastic members disposed at the different positions of the holder have different elastic coefficients along a direction of the force exerted by the axis-moving motor on the holder. In this case, the holder rotates with no need to control different driving forces of the motors at the different positions of the holder on the holder. Therefore, control on the axis-moving motor is simplified, efficiency is improved, and the holder can be prevented from rotating in a non-rotation direction or a non-translation direction.

Further, in some embodiments of this application, the lens actuating apparatus further includes a plurality of position sensors. The position sensors one-to-one correspond to the axis-moving motor and the translation motor. A position closed loop can be formed by disposing the position sensors that one-to-one correspond to the axis-moving motor and the translation motor. The closed loop means that a feedback mechanism that has a capability of automatically correcting deviation of a controlled amount, and can correct an error caused by a parameter change of an element and external disturbance is used, so that control accuracy is high. In some embodiments of this application, the position sensor is a Hall (Hall) sensor. The Hall sensor can measure magnetic field strengths at different positions, and feed back the magnetic field strengths obtained through measurement to a drive controller. The drive controller controls movement directions and movement speeds of the translation motor and/or the axis-moving motor based on information obtained by the position sensor, to implement relatively accurate focusing and anti-shake operations.

Figure 2:
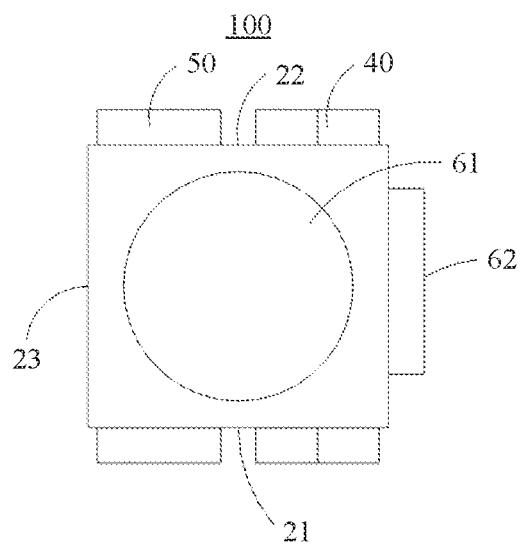
FIG. 2 is a schematic top view of the lens actuating apparatus shown in FIG. 1.

Referring to FIG. 1 and FIG. 2, specifically, an embodiment of this application provides a lens actuating apparatus 100. The lens actuating apparatus 100 includes a housing (not shown in the figure), a holder 20, a plurality of elastic members 30, translation motors 40, and axis-moving motors 50. The housing includes an accommodation cavity. The holder 20, the plurality of elastic members 30, the translation motors 40, and the axis-moving motors 50 all are accommodated in the accommodation cavity. The housing is configured to protect a structure disposed inside the housing. It may be understood that when the lens actuating apparatus 100 is disposed inside a photographing device, the housing may be fastened to a housing of the photographing device, or may be a housing of the photographing device. An optical component 60 is installed on the holder 20, and moves with the holder 20. It may be understood that "installation" in this application may be direct installation or indirect installation. For example, in this embodiment, the optical component 60 is first installed inside a mounting bracket 60a, and then the mounting bracket 60a is fastened to the holder 20, so that the optical component 60 is indirectly installed on the holder 20.

The optical component 60 includes a light incident surface 61 and a light emergent surface 62 that has an included angle with the light incident surface 61. The light incident surface 61 has a light incident axis 61a perpendicular to the light incident surface 61, and the light incident axis 61a passes through the center of the light incident surface 61. The light emergent surface 62 has a light emergent axis 62a perpendicular to the light emergent surface 62, and the light emergent axis 62a passes through the center of the light emergent surface 62. It should be noted that the light incident axis 61a and the light emergent axis 62a are not actual axial lines. In other words, both the light incident axis 61a and the light emergent axis 62a are virtual lines. The included angle exists between the light incident surface 61 and the light emergent surface 62 of the optical component 60. To be specific, the optical component 60 can change a propagation direction of light passing through the optical component.

Figure 3:
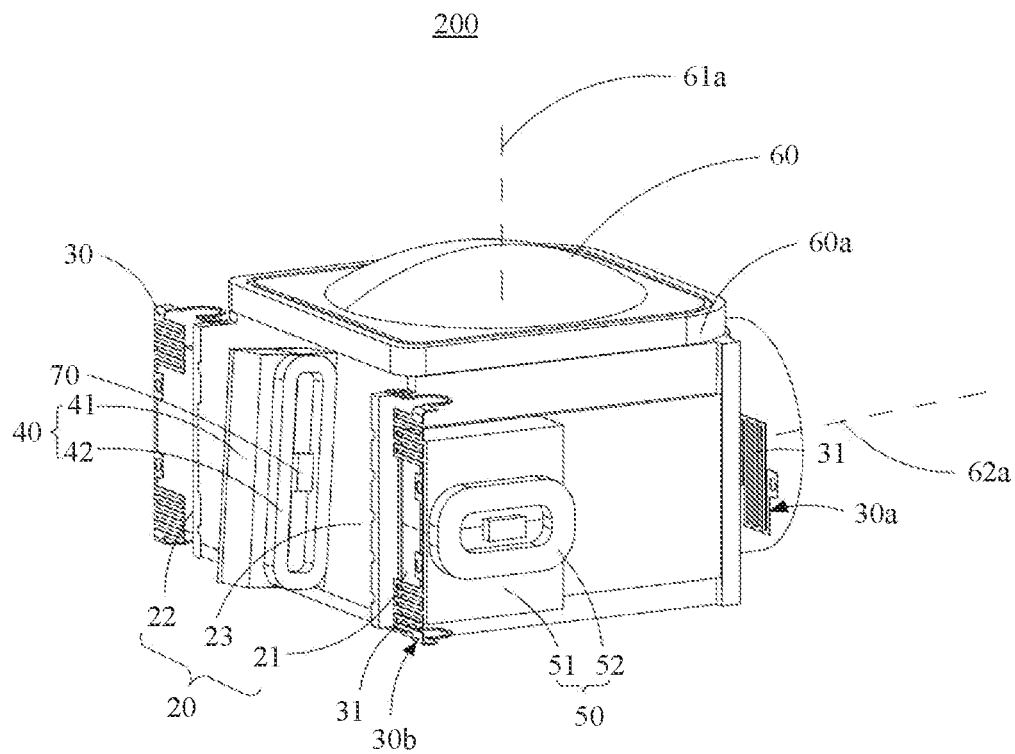
FIG. 3 is a schematic structural diagram of a lens actuating apparatus according to another embodiment of this application.
Figure 4:
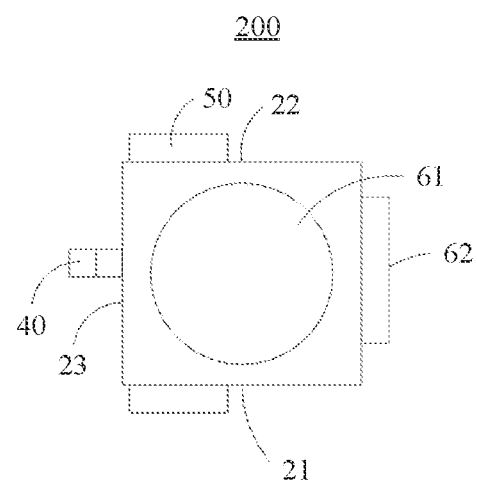
FIG. 4 is a schematic top view of the lens actuating apparatus shown in FIG. 3.

The holder 20 includes a first surface 21 and a second surface 22 that are disposed oppositely, and a third surface 23 connected between the first surface 21 and the second surface 22. The third surface 23 is far away from the light emergent surface 62 of the optical component 60. The axis-moving motors 50 are symmetrically disposed on the first surface 21 and the second surface 22. In this embodiment, there are two axis-moving motors 50 that are respectively disposed on a side of the first surface 21 and a side of the second surface 22 that are close to the third surface 23. The translation motors 40 are located at the center of the third surface 23, or the translation motors 40 are symmetrically disposed on the first surface 21 and the second surface 22, and the translation motor 40 and the axis-moving motor 50 that are located on the same surface are arranged side by side along a direction of the light emergent axis. In this embodiment, the translation motors 40 are symmetrically disposed on the first surface 21 and the second surface 22, and are disposed close to the light emergent surface 62. FIG. 3 and FIG. 4 show a lens actuating apparatus 200 according to another embodiment of this application. The lens actuating apparatus 200 in the embodiment in FIG. 3 differs from the lens actuating apparatus 100 in the embodiment in FIG. 1 in that there is one translation motor 40, and the translation motor 40 is disposed on a central plane of a third surface 23. It may be understood that there may alternatively be a plurality of translation motors 40. The plurality of translation motors 40 are arranged on the third surface 23 side by side along a direction from a first surface 21 to a second surface 22, and the center of an overall structure obtained after the plurality of translation motors 40 are arranged side by side overlaps with the center of the third surface 23. In this case, a holder 20 bears a same force on a side on which the first surface 21 is located and a side on which the second surface 22 is located, to avoid generating relatively large torque and a relatively large angle of inclination in a non-rotation direction due to uneven forces.

Referring to FIG. 1 again, both the translation motors 40 and the axis-moving motors 50 are voice coil motors. The voice coil motor includes a magnet and a coil that moves relative to the magnet. Different currents are input into the coil, to control a magnitude of a Lorentz force between the coil and the magnet, so as to control, based on an actual requirement, an acting force for driving the holder 20 relative to the housing. The translation motor 40 includes a magnet 41 and a coil 42 that moves relative to the magnet 41. The magnet 41 is a movable part of the translation motor 40 and is fastened to the holder 20. The coil 42 is a fastening part of the translation motor 40. The axis-moving motor 50 includes a magnet 51 and a coil 52 that moves relative to the magnet 51. The magnet 51 is a movable part of the axis-moving motor 50 and is fastened to the holder 20. The coil 42 is a fastening part of the translation motor 40. A direction from an N pole to an S pole of the magnet 41 is the same as a direction of the light emergent axis 62a, so that a Lorentz force along the direction of the light emergent axis 62a is generated between the magnet 41 and the coil 42. A direction from an N pole to an S pole of the movable part of the axis-moving motor 50 is the same as a direction of the light incident axis 61*a*, so that a Lorentz force along the direction of the light incident axis 61*a* is generated between the magnet 51 and the coil 52. The axis-moving motors 50 cooperate with the elastic members 30 to generate rotation around a rotation axis perpendicular to the first surface 21.

In this embodiment, because the direction from the N pole to the S pole of the magnet 41 is the same as the direction of the light emergent axis 62*a*, the Lorentz force along the direction of the light emergent axis 62*a* is generated between the magnet 41 and the coil 42. In this way, a translation direction in which the holder 20 translates relative to the housing is parallel to the light emergent axis 62*a*. The rotation axis of the elastic member is disposed to be perpendicular to both the light incident axis and the light emergent axis. When the lens actuating apparatus 100 is applied to a photographing module, the lens actuating apparatus 100 drives the optical component 60 to move along the direction of the light emergent axis, so that a distance between the optical component 60 and a photosensitive chip 1003 can be adjusted, to be specific, an imaging distance can be adjusted. In this way, focusing of the photographing module can be implemented. Moreover, the rotation axis is perpendicular to both the light incident axis and the light emergent axis, so that the holder 20 can drive the optical component 60 to implement anti-shake along the direction of the light emergent axis.

In some embodiments, the magnets (the magnet 41 and the magnet 51) each include 2×n sub-magnets 411, where n is a natural number greater than 0. In this embodiment, the magnet includes two sub-magnets 411. N poles or S poles of adjacent sub-magnets 411 are opposite. Specifically, the magnet includes a first surface fastened to the holder and a second surface opposite to the first surface, the coil faces the second surface, and magnetic poles of the two adjacent sub-magnets 411 facing a side of the second surface are opposite. In this embodiment, each sub-magnet 411 is independent. It may be understood that, in another embodiment of this application, the sub-magnets of the magnet may be obtained in a specific magnetization manner. For example, in an embodiment of this application, the magnet is a single-side bipolar paired magnetized magnet, to be specific, two parts with opposite magnetic poles are formed for the magnet in the specific magnetization manner. The two parts with opposite magnetic poles are equivalent to two sub-magnets 411.

In some embodiments of this application, each magnet is fastened with a position sensor 70, and the position sensor 70 is located at a junction of two sub-magnets 411 at the center of the magnet. A magnetic field linear region is near the junction of the two sub-magnets 411 located at the center of the magnet, so that there is a linear relationship between a position change of a position relative to the coil and a magnetic field change of the position relative to the coil. There is a poor linear relationship between another position and the magnetic field change, and a position detection effect is poor.

Figure 5:
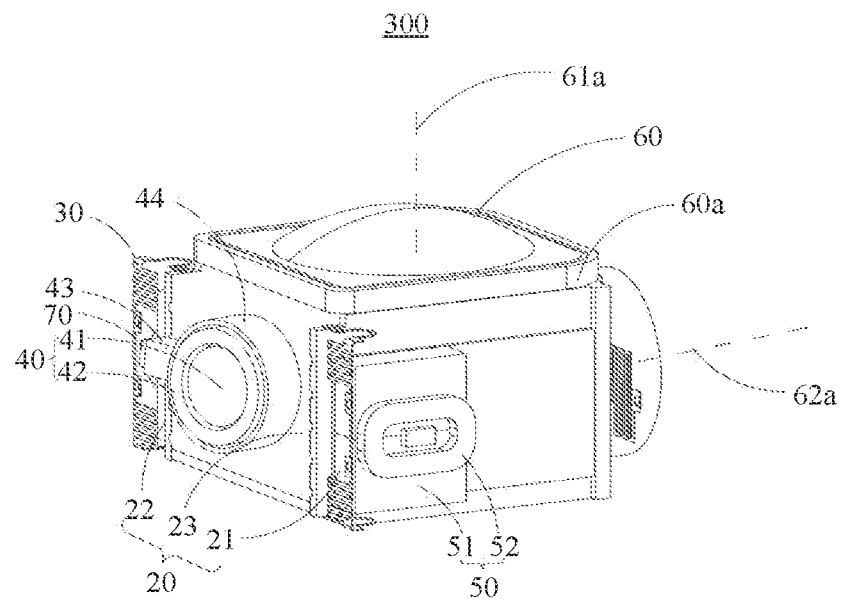
FIG. 5 is a schematic structural diagram of a lens actuating apparatus according to another embodiment of this application.

In another embodiment of this application, the magnet is a single magnet, and a direction towards which an N pole of the magnet faces is opposite to a direction towards which an S pole of the magnet faces. The position sensor is fastened to the housing and faces a side face of the magnet, and the side face of the magnet is perpendicular to the direction towards which the N pole of the magnet faces and the direction towards which the S pole of the magnet faces. For example, FIG. 5 shows a lens actuating apparatus 300 according to another embodiment of this application. The lens actuating apparatus 300 in the embodiment in FIG. 5 differs from the lens actuating apparatus 200 in the embodiment in FIG. 3 in that a magnet 41 of a translation motor 40 is a single magnet, an N pole of the magnet 41 is against a third surface 23. Specifically, the magnet 41 of the translation motor 40 of the lens actuating apparatus 300 is a single cylindrical magnet, two sides of the magnet 41 in an axial direction are the N pole and an S pole, and a side face of the magnet 41 is a side face between the N pole and the S pole. A coil 42 of the translation motor 40 of the lens actuating apparatus 300 is a ring coil, and the ring coil is annularly disposed outside a side face of the cylindrical magnet. After being powered on, a Lorentz force along the axial direction of the magnet is generated between the coil and the magnet, so that the magnet 41 moves along the axial direction of the magnet relative to the coil 42. In this embodiment, the side face of the magnet 41 is fastened with an induced magnet 43, and a position sensor 70 is fastened to the housing and is opposite to the induced magnet 43, to sense a position change of the induced magnet 43, so as to obtain parameters such as a speed and a distance at which a holder 20 moves relative to the housing.

Figure 6:
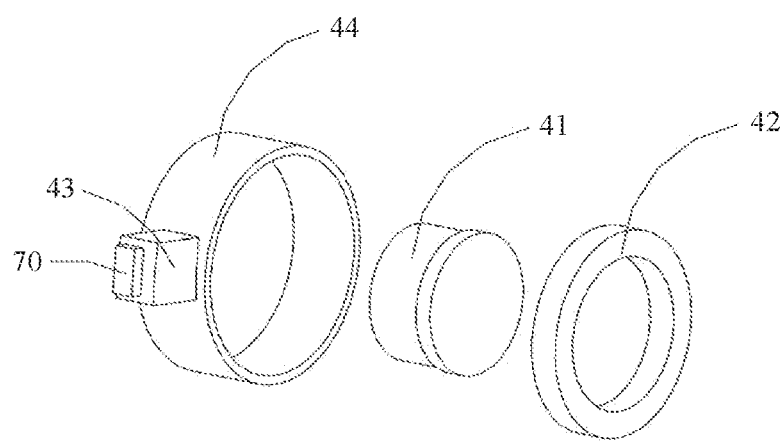
FIG. 6 is a schematic structural diagram of a translation motor and a position sensor according to an embodiment of this application.

Further, referring to FIG. 5 and FIG. 6, in some embodiments of this application, an outer surface of the magnet 41 is coated with a magnetic conductive housing 44 that has a magnetic conductive function and increases a main magnetic flux of the magnet 41.

Referring to FIG. 1 again, in this embodiment, the elastic member 30 is sheet-shaped, and the light incident axis 61*a* is parallel to a plane on which the elastic members 30 are located, to be specific, the elastic members 30 are disposed perpendicular to the first surface 21. The plane on which the elastic members 30 are located is parallel to the light incident axis 61*a*, so that the elastic members 30 cannot be disposed along the direction of the light incident axis 61*a*, to prevent the elastic members 30 from increasing a thickness of the lens actuating apparatus 100 along the direction of the light incident axis 61*a*.

Further, in this application, because the elastic member 30 is a two degree-of-freedom elastomer, to be specific, elastic coefficients of the elastic member 30 in two of three orthogonal directions are less than an elastic coefficient of the elastic member 30 in the other direction, the elastic member 30 is more easily deformed in the two of the three orthogonal directions than in the other direction. In the lens actuating apparatus 100 shown in FIG. 1, the plurality of elastic members 30 are symmetrically disposed on the first surface 21 and the second surface 22, and the elastic members 30 are disposed on both sides that are of the first surface 21 and the second surface 22 and that are close to the third surface 23 and sides that are of the first surface 21 and the second surface 22 and that are away from the third surface 23. In this way, the holder 20 is stably supported in the housing. Specifically, in this embodiment, there are four elastic members 30 that are pairwise symmetrically disposed on the first surface 21 and the second surface 22. In addition, in this embodiment, a first direction is the light emergent axis 62*a*, a second direction is a direction perpendicular to the first surface 21, and a third direction is the direction of the light incident axis 61*a*. The elastic members 30 disposed on the first surface 21 and the second surface 22 each includes a translation elastic member 30*a* and a common elastic member 30*b*. Both an elastic coefficient of the translation elastic member 30*a* along the direction of the light emergent axis 62*a* and an elastic coefficient of the translation elastic member 30*a* along a direction of the rotation axis are less than an elastic coefficient of the translation elastic member 30a along the direction of the light incident axis 61a. To be specific, an elastic coefficient of the translation elastic member 30a in the first direction and an elastic coefficient of the translation elastic member 30a in the second direction are less than an elastic coefficient of the translation elastic member 30a in the third direction. An elastic coefficient of the common elastic member 30b along the direction of the rotation axis is greater than an elastic coefficient of the common elastic member 30b along the direction of the light incident axis and an elastic coefficient of the common elastic member 30b along the direction of the light emergent axis. To be specific, an elastic coefficient of the common elastic member 30b in the first direction and an elastic coefficient of the common elastic member 30b in the third direction are less than an elastic coefficient of the common elastic member 30b in the second direction. In addition, in this embodiment, an elastic coefficient of the translation elastic member 30a along a direction parallel to the light incident axis 61a is greater than an elastic coefficient of the common elastic member 30b along the direction parallel to the light incident axis 61a.

The translation elastic member 30a and the common elastic member 30b are respectively disposed on two sides of the first surface 21 and the second surface 22 along the direction of the light emergent axis. The translation elastic member 30a is far away from the third surface 23 relative to the common elastic member 30b, and the common elastic member 30b is close to the third surface 23 relative to the translation elastic member 30a. When the axis-moving motor 50 exerts a force on the holder 20 along the light incident axis 61a, the elastic coefficient of the translation elastic member 30a in the first direction is greater than the elastic coefficient of the common elastic member 30b in the first direction, so that a deformation amount of the translation elastic member 30a in the third direction is less than a deformation amount of the common elastic member 30b in the third direction. Therefore, rotation by using the second direction (perpendicular to the first surface 21) as a rotation axis is generated. In this application, the axis-moving motors 50 cooperate with the elastic members 30 to implement rotation of the holder 20, and the holder rotates with no need to separately control different driving forces of motors at different positions of the holder on the holder. In this way, control on the axis-moving motor 50 is simplified, and efficiency is improved.

Figure 7A:
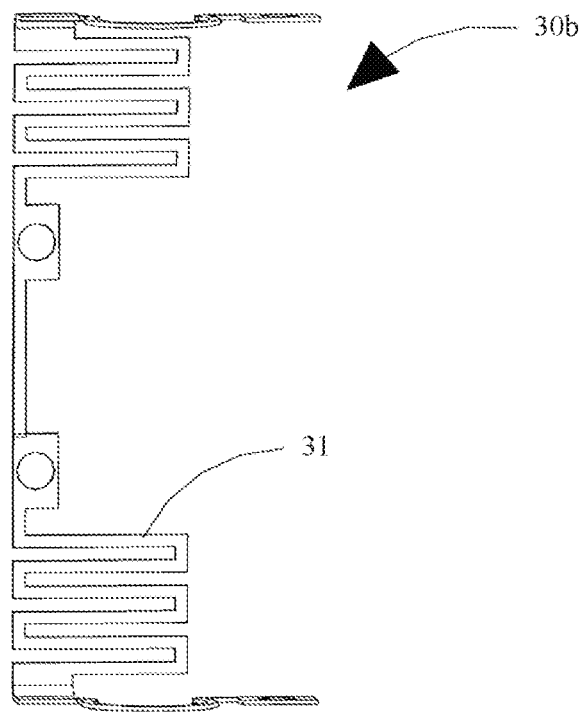
FIG. 7a is a schematic structural diagram of a common elastic member according to an embodiment of this application.
Figure 7B:
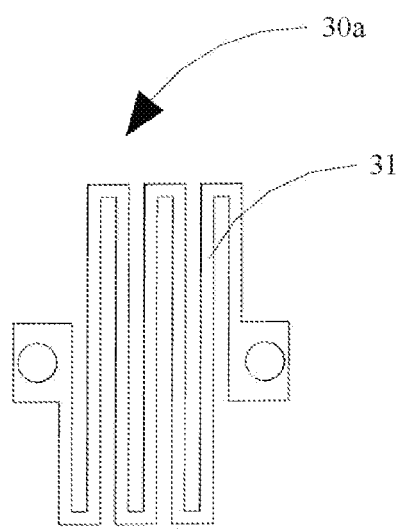
FIG. 7b is a schematic structural diagram of a translation elastic member according to an embodiment of this application.

Specifically, referring to FIG. 7a and FIG. 7b, in an embodiment, a translation elastic member 30a and a common elastic member 30b each include a plurality of etched arms 31 that are disposed at intervals and head-to-tail connected. An extension direction of an etched arm 31 of the translation elastic member 30a is parallel to a light incident axis, and an extension direction of an etched arm 31 of the common elastic member 30b is perpendicular to a first surface 21, so that both an elastic coefficient of the translation elastic member 30a along a direction of a light emergent axis and an elastic coefficient of the translation elastic member 30a along a direction of a rotation axis are less than an elastic coefficient of the translation elastic member 30a along a direction of the light incident axis 61a, and an elastic coefficient of the common elastic member 30b along the direction of the rotation axis is greater than an elastic coefficient of the common elastic member 30b along the direction of the light incident axis 61a and an elastic coefficient of the common elastic member 30b along the direction of the light emergent axis 62a. In this embodiment, the elastic member 30 is a metal component, and the plurality of head-to-tail connected etched arms 31 are obtained by bending a linear metal spring plate into a wave shape. Alternatively, in some embodiments, the etched arms 31 may be obtained by etching a metal plate.

Figure 8:
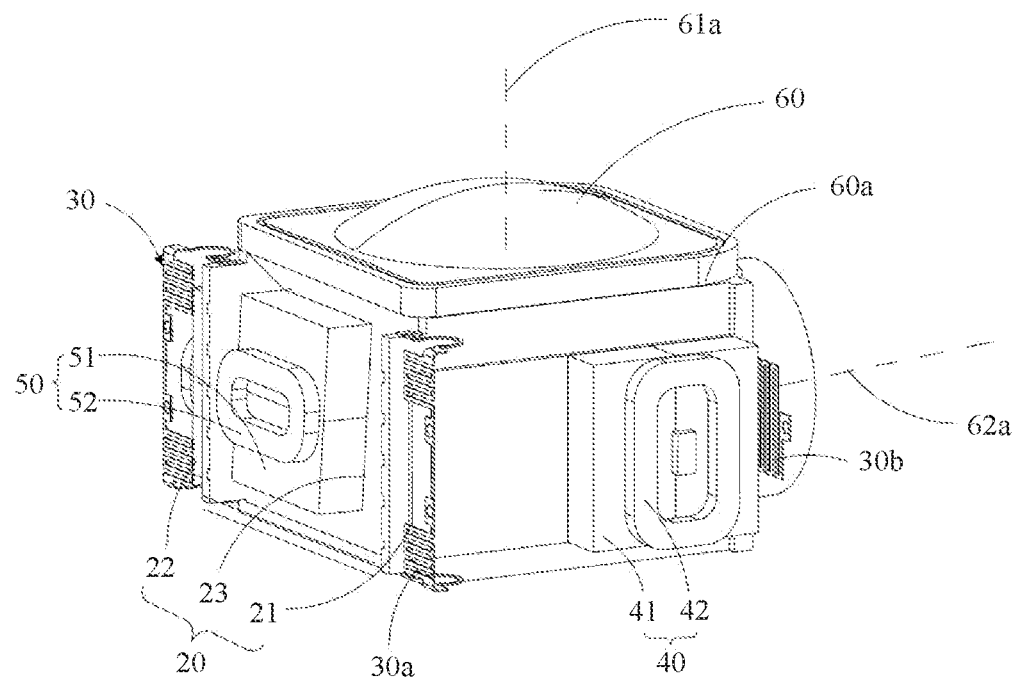
FIG. 8 is a schematic structural diagram of a lens actuating apparatus according to another embodiment of this application.
Figure 9:
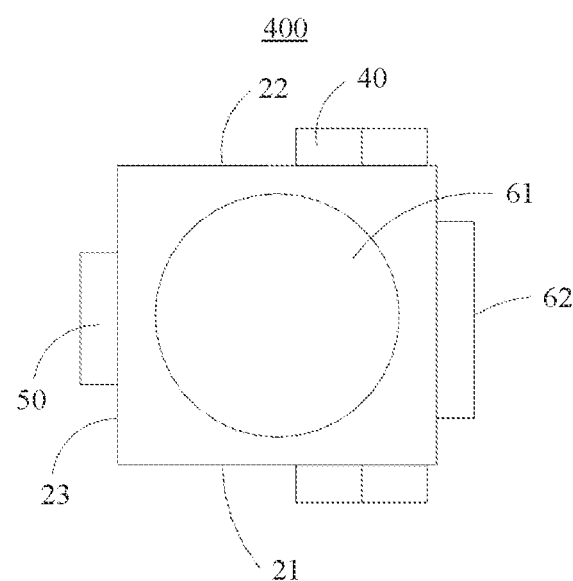
FIG. 9 is a schematic top view of the lens actuating apparatus shown in FIG. 8.

In some other embodiments of this application, an axis-moving motor is disposed at the center of a third surface, and translation motors are symmetrically disposed on the first surface and a second surface, to drive a holder to rotate around the rotation axis perpendicular to the first surface, and translate in a movement direction that is the direction of the light emergent axis. FIG. 8 and FIG. 9 show a lens actuating apparatus 400 according to an embodiment of this application. The lens actuating apparatus 400 differs from the lens actuating apparatus 100 in that an axis-moving motor 50 is located in the center of a third surface 23. In this case, an acting force exerted by the axis-moving motor 50 on a holder 20 is located on the third surface 23 and parallel to a light incident axis 62a, so that the acting force exerted by the axis-moving motor 50 on the third surface 23 is greater than an acting force exerted by the axis-moving motor 50 on one side of a light emergent surface 62. In this way, the holder 20 can rotate along a direction of a rotation axis perpendicular to a first surface 21. In this embodiment, the acting force exerted by the axis-moving motor 50 on the third surface 23 is greater than the acting force exerted by the axis-moving motor 50 on the side of the light emergent surface 62, so that the holder 20 can rotate along the direction of the rotation axis perpendicular to the first surface 21. Therefore, elastic members 30 disposed on the first surface 21 and a second surface 22 each may be a common elastic member 30b, to prevent the elastic members 30 from limiting translation and rotation of the holder 20. It may be understood that, in this embodiment, structures and positions of the elastic members 30 on the first surface 21 and the second surface 22 may also be the same as structures and positions of the elastic members 30 in the lens actuating apparatus 100.

In some other embodiments of this application, both the translation motor and the axis-moving motor are voice coil motors, and both movable parts of the translation motor and the axis-moving motor are magnets and are fastened to the holder. A direction from an N pole to an S pole of a fastening part of the translation motor 40 is perpendicular to a light emergent axis and a light emergent axis, and a directions from an N pole to an S pole of a fastening part of the axis-moving motor is the same as a direction of the light incident axis. A direction from an N pole to an S pole of a movable part of the translation motor is perpendicular to the light emergent axis and the light emergent axis, so that a direction of a Lorentz force between a magnet and a coil of the translation motor is perpendicular to a direction of the light emergent axis and the direction of the light incident axis, to drive the holder to translate along a direction perpendicular to the light emergent axis and the light incident axis. A direction from an N pole to an S pole of a movable part of the axis-moving motor is the same as the direction of the light incident axis, so that a direction of a Lorentz force between a magnet and a coil of the axis-moving motor is the direction of the light incident axis, to drive the holder to rotate along the direction of the rotation axis perpendicular to the light emergent axis and the light incident axis. To be specific, in these embodiments, a translation direction in which the translation motor drives the holder to move is parallel to a direction of a rotation axis in which the axis-moving motor drives the holder to rotate. In these embodiments, the axis-moving motors are symmetrically disposed on the first surface and the second surface, and the translation motor is located at the center of the third surface or the translation motors are symmetrically disposed on the first surface and the second surface, or the axis-moving motor is disposed at the center of the third surface and the translation motors are symmetrically disposed on the first surface and the second surface, so that the holder can be driven to rotate around the rotation axis perpendicular to the first surface, and translate in a movement direction that is the direction of the light emergent axis. Both the axis-moving motors and the translation motors are symmetrically disposed on the first surface and the second surface, or the axis-moving motor and the translation motor are disposed at the center of the third surface, so that forces of the first surface and the second surface are the same, to prevent from generating deflection and torques caused by different forces on the first surface and the second surface in a process of the translation or the rotation of the holder.

Figure 10:
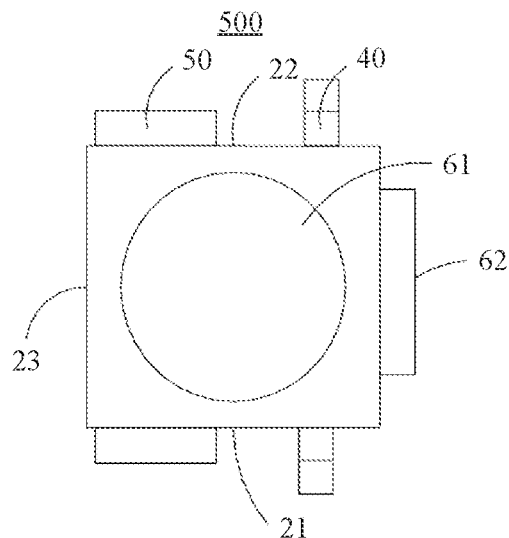
FIG. 10 is a schematic top view of a lens actuating apparatus according to another embodiment of this application.

Specifically, FIG. 10 shows a lens actuating apparatus 500 according to this application. A translation direction of a holder 20 in the lens actuating apparatus 500 is parallel to a direction that is of a rotation axis and in which the holder 20 rotates. The lens actuating apparatus 500 differs from the lens actuating apparatus 100 shown in FIG. 1 in that a direction from an N pole of a translation motor 40 to an S pole of the translation motor 40 is perpendicular to both a light emergent axis 62a and a light incident axis 61a. The translation direction in which the translation motor 40 drives the holder 20 is parallel to the direction from the N pole of the translation motor 40 to the S pole of the translation motor 40. In addition, a plane on which a translation elastic member 30a and a common elastic member 30b are located is parallel to the light emergent axis 62a, to ensure that both elastic coefficients of the translation elastic member 30a and the common elastic member 30b in the translation direction are relatively small, and prevent the translation elastic member 30a and the common elastic member 30b from limiting a translation process of the holder 20.

Figure 11:
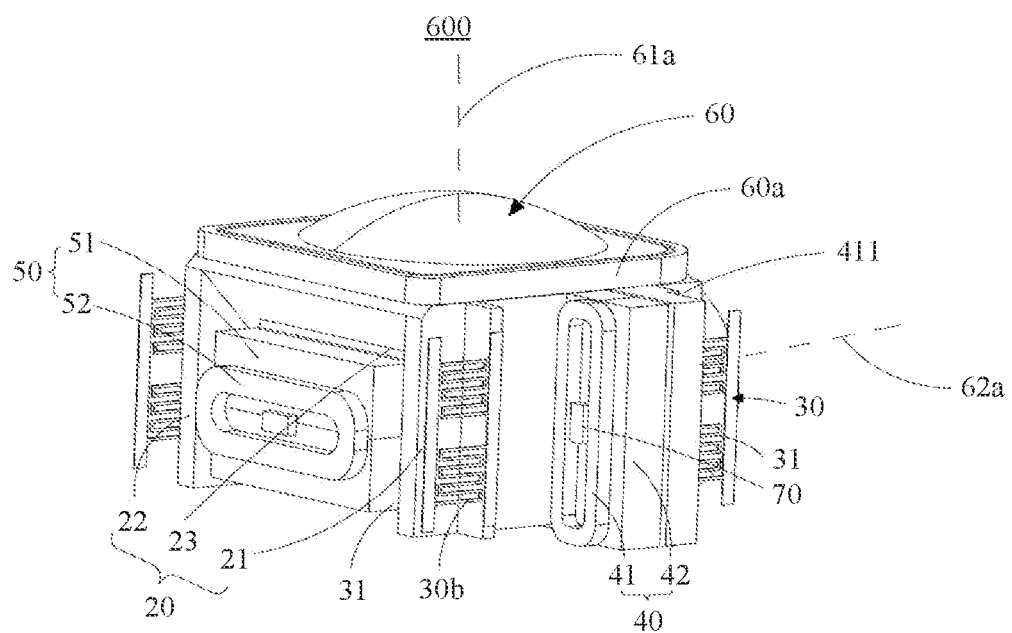
FIG. 11 is a schematic structural diagram of a lens actuating apparatus according to another embodiment of this application.
Figure 12:
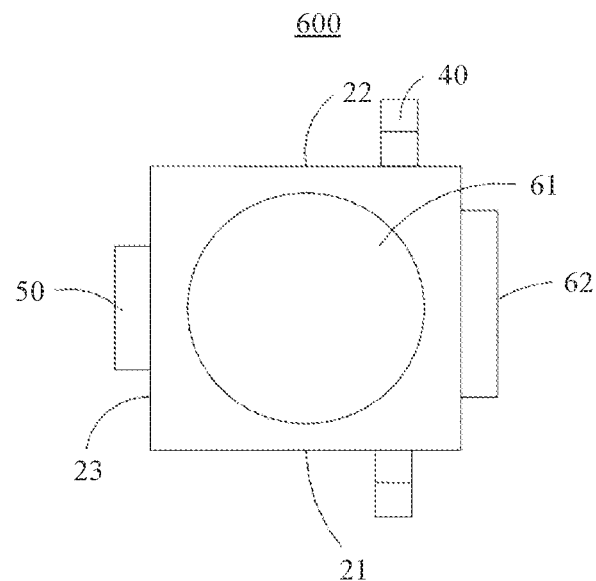
FIG. 12 is a schematic top view of the lens actuating apparatus shown in FIG. 11.

FIG. 11 and FIG. 12 show a lens actuating apparatus 600 according to this application. The lens actuating apparatus 600 differs from the lens actuating apparatus 500 in that an axis-moving motor 50 is disposed at the center of a third surface 23, and translation motors 40 are symmetrically disposed on a first surface 21 and a second surface 22. In addition, in this embodiment, each of elastic members 30 of the lens actuating apparatus 600 is a common elastic member 30b. To be specific, an elastic coefficient of the elastic member 30 in a translation direction of a holder and an elastic coefficient of the elastic member 30 along a direction perpendicular to the translation direction and a rotation axis are less than an elastic coefficient of the elastic member 30 along a direction of the rotation axis. In this embodiment, both an elastic coefficient of the elastic member 30 along a direction of a light emergent axis 62a and an elastic coefficient of the elastic member 30 along a direction of a light incident axis 61a are less than an elastic coefficient of the elastic member 30 along a direction perpendicular to the light emergent axis 62a and the light incident axis 61a. The axis-moving motor 50 is disposed on the third surface 23, so that a force exerted by the axis-moving motor 50 on a side of the third surface 23 of the holder 20 is greater than a force exerted by the axis-moving motor 50 on one side of a light emergent surface 62. When both the elastic coefficient of the elastic member 30 along the direction of the light emergent axis 62a and the elastic coefficient of the elastic member 30 along the direction of the light incident axis 61a are less than the elastic coefficient of the elastic member 30 along the direction perpendicular to the light emergent axis 62a and the light incident axis 61a, rotation along the direction of the rotation axis perpendicular to the first surface 21 is generated. In addition, when both the elastic coefficient of the elastic member 30 along the direction of the light emergent axis 62a and the elastic coefficient of the elastic member 30 along the direction of the light incident axis 61a are less than the elastic coefficient of the elastic member 30 along the direction perpendicular to the light emergent axis 62a and the light incident axis 61a, the holder 20 can translate along the direction of the light emergent axis 62a, but movement of the holder along the direction perpendicular to the first surface 21 is limited. The holder 20 is prevented from moving along a direction in which the movement does not need to be performed, to implement accurate control on the movement of the holder 20. In this embodiment, each of common elastic members includes a plurality of etched arms 31 that are disposed at intervals and head-to-tail connected, and an extension direction of an etched arm 31 is perpendicular to the light incident axis 61a and the light emergent axis 62a, so that both the elastic coefficient of the elastic member 30 along the direction of the light emergent axis 62a and the elastic coefficient of the elastic member 30 along the direction of the light incident axis 61a are less than the elastic coefficient of the elastic member 30 along the direction perpendicular to the light emergent axis 62a and the light incident axis 61a.

Figure 13:
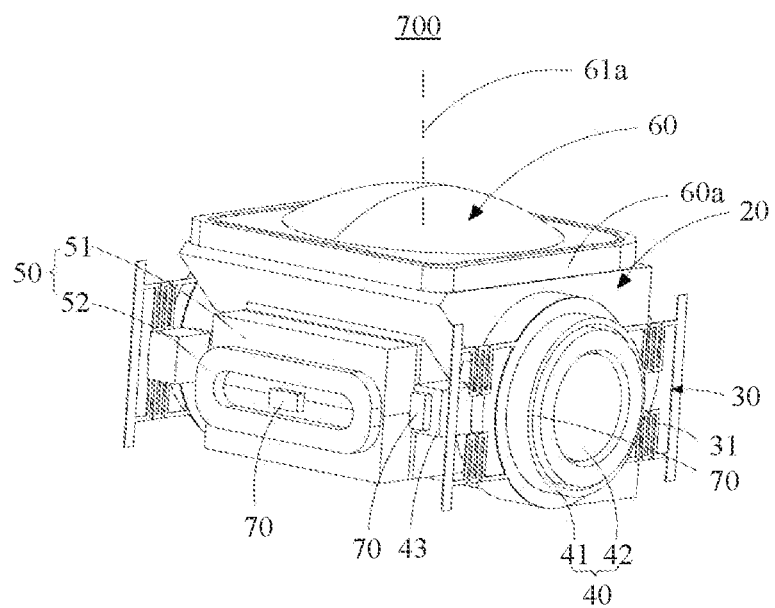
FIG. 13 is a schematic structural diagram of a lens actuating apparatus according to another embodiment of this application.

FIG. 13 shows another lens actuating apparatus 700 according to this application. The lens actuating apparatus 700 differs from the lens actuating apparatus 600 in that a magnet of a translation motor of the lens actuating apparatus 700 is a single magnet that is the same as that of the translation motor in the lens actuating apparatus 300.

Figure 14:
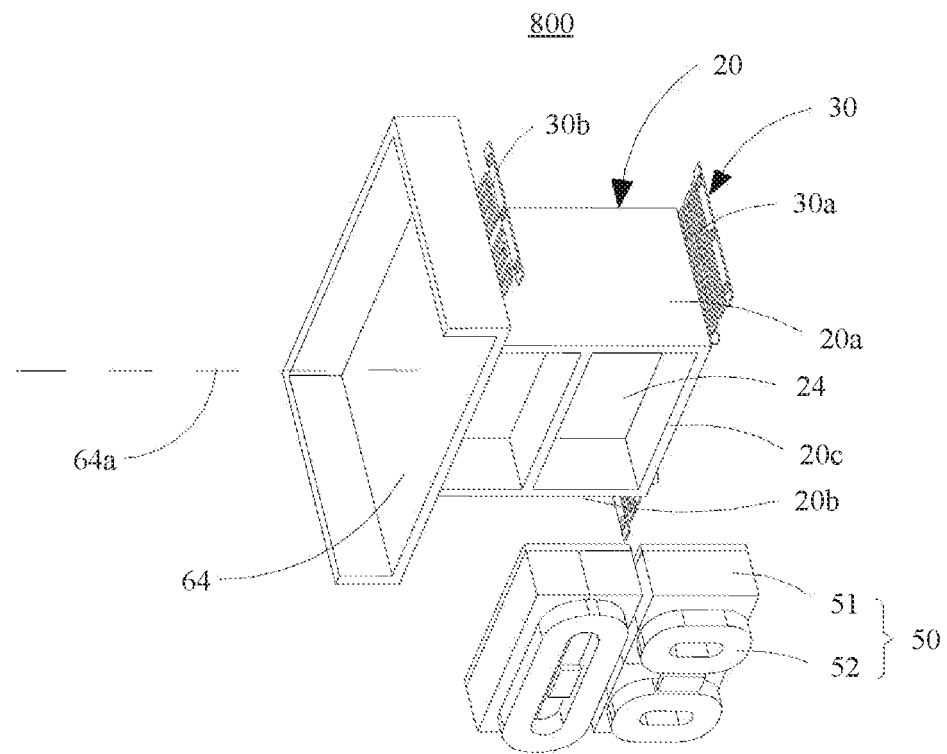
FIG. 14 is a schematic structural diagram of a lens actuating apparatus according to another embodiment of this application.
Figure 15:
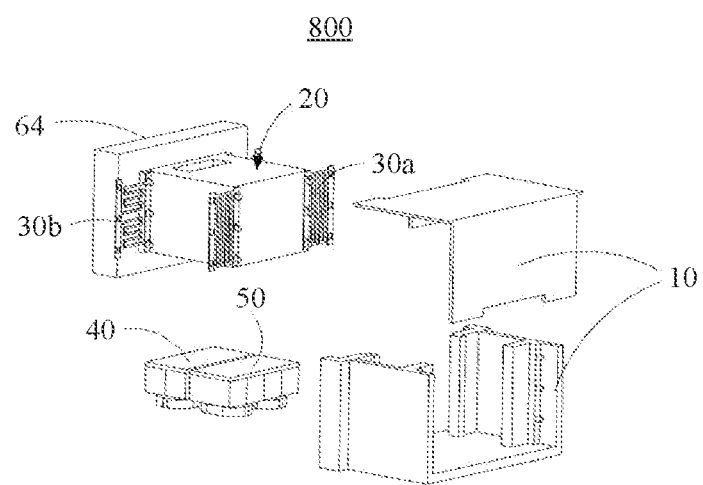
FIG. 15 is a disassembled schematic structural diagram of the lens actuating apparatus according to the FIG. 14.

This application further provides a lens actuating apparatus. An optical component of the lens actuating apparatus includes a single reflection plane and has a single optical axis. To be specific, a light incident surface and a light emergent surface of the optical component each is the reflection plane. Light is incident to the reflection plane, and is reflected by the reflection plane before being emitted. A central axis of the reflection plane is the optical axis. It may be understood that the optical axis is a virtual axis instead of an actual axis. FIG. 14 and FIG. 15 show another lens actuating apparatus 800 according to this application. An optical component 60 of the lens actuating apparatus 800 includes a single reflection plane 64 and has a single optical axis 64a. Each of elastic members 30 is sheet-shaped and the optical axis 64a is perpendicular to a plane on which the elastic members 30 are located, so that an elastic coefficient of the elastic member 30 along a direction of the optical axis 64a is relatively small, and a holder 20 can move relatively easily along the direction of the optical axis 64a. The lens actuating apparatus 800 in this embodiment differs from the lens actuating apparatus 100 in FIG. 1 in that there are one translation motor 40 and one axis-moving motor 50, and the translation motor 40 and the axis-moving motor 50 are arranged side by side along the direction of the optical axis 64a, and are built in a side face that is of the holder 20 and that is parallel to the optical axis 64a. Side faces that are of the holder 20 and that are parallel to the optical axis 64a include a first side face 20a and a second side face 20b that are opposite, and a third side face 20c connected between the first side face 20a and the second side face 20b. Two accommodation grooves 24 are recessed on the third side face 20c. The translation motor 40 and the axis-moving motor 50 are separately accommodated in one accommodation groove 24, so that the translation motor 40 and the axis-moving motor 50 are built in the third side face 20c, and further, the translation motor 40 and the axis-moving motor 50 are enabled to approach the geometric center of the holder 20, to prevent the translation motor 40 or the axis-moving motor 50 from exerting a force on the holder 20 to deviate from a required position, and further prevent the holder 20 from generating a relatively large torque and a relatively large angle of inclination in a non-rotation direction.

In this embodiment, the elastic members 30 are disposed on the first side face 20a and the second side face 20b, and are disposed along a direction perpendicular to a movement direction. In addition, in this embodiment, the elastic members 30 disposed on the first side face 20a and the second side face 20b each include a translation elastic member 30a and a common elastic member 30b that have same structures as those of the lens actuating apparatus 100. Specifically, both an elastic coefficient of the translation elastic member 30a along the direction of the optical axis 64a and an elastic coefficient of the translation elastic member 30a along a direction parallel to the first side face 20a are less than an elastic coefficient of a direction perpendicular to the first side face 20a. Both an elastic coefficient of the common elastic member 30b along the direction of the optical axis 64a and an elastic coefficient of the common elastic member 30b along the direction perpendicular to the first side face 20a are less than an elastic coefficient of the common elastic member 30b along the direction parallel to the first side face 20a. The translation elastic member 30a and the common elastic member 30b are respectively disposed on two sides of the first side face 20a and the second side face 20b along the direction of the optical axis 64a. The translation elastic member 30a is close to the reflection plane 64 relative to the common elastic member 30b, and the common elastic member 30b is far away from the reflection plane 64 relative to the translation elastic member 30a.

In this embodiment, a translation direction in which the holder 20 of the lens actuating apparatus 800 translates relative to a housing 10 is parallel to the direction of the optical axis 64a, and a direction that is of a rotation axis and in which the holder 20 rotates relative to the housing 10 is perpendicular to the translation direction, so that when the lens actuating apparatus 100 is applied to a photographing module, translating the holder 20 along the translation direction can implement focusing, and rotating the holder 20 by using the rotation axis as an axis to implement axis moving of the photographing module. In this way, shake is compensated and anti-shake is implemented.

The translation elastic member 30a is close to the reflection plane relative to the common elastic member 30b, and the common elastic member 30b is far away from the reflection plane relative to the translation elastic member 30a. Therefore, an elastic coefficient of the translation motor 40 is relatively large along the direction of the light incident axis 64a, and an elastic coefficient of the common elastic member 30b is relatively small along the direction of the light incident axis 64a. In this case, when the axis-moving motor 50 exerts the force on the holder 20 along the direction parallel to the first side face 20a, deformation of the translation elastic member 30a along the direction parallel to the first side face 20a is less than deformation of the common elastic member 30b along the direction parallel to the first side face 20a. In this way, rotation along a direction of the rotation axis perpendicular to the first side face 20a is generated.

In this embodiment, the translation elastic member 30a and the common elastic member 30b each include a plurality of etched arms 31 that are disposed at intervals and head-to-tail connected. An extension direction of an etched arm 31 of the translation elastic member 30a is perpendicular to the first side face 20a, and an etched arm 31 of the common elastic member 30b is parallel to the first side face 20a, so that both the elastic coefficient of the translation elastic member 30a along the direction of the optical axis 64a and the elastic coefficient of the translation elastic member 30a along the direction parallel to the first side face 20a are less than the elastic coefficient of the translation elastic member 30a along the direction perpendicular to the first side face 20a. Both the elastic coefficient of the common elastic member 30b along the direction of the optical axis 64a and the elastic coefficient of the common elastic member 30b along the direction perpendicular to the first side face 20a are less than the elastic coefficient of the common elastic member 30b along the direction parallel to the first side face 20a.

Figure 16:
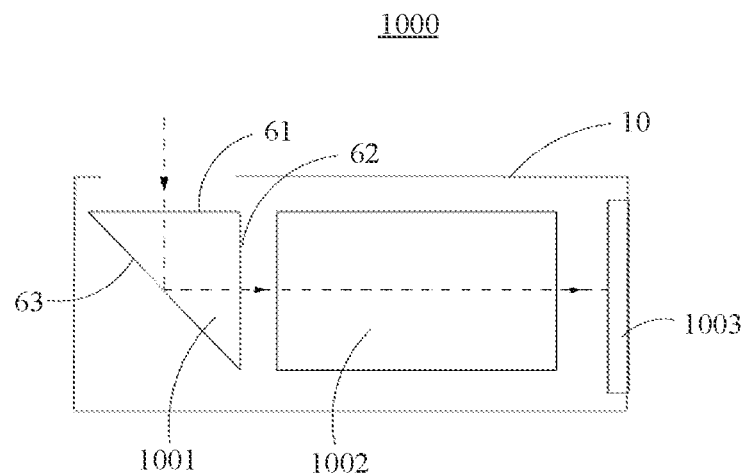
FIG. 16 is a schematic diagram of an imaging principle of a periscope lens module according to an embodiment of this application.

FIG. 16 shows a periscope photographing module 1000 according to an embodiment of this application. An arrow direction in the figure represents a propagation path of light inside the periscope photographing module 1000. The periscope photographing module 1000 includes a first reflector 1001, a lens group 1002, a photosensitive chip 1003, and the lens actuating apparatus in any one of the foregoing embodiments. An optical component 60 installed on a holder 20 of the lens actuating apparatus includes the first reflector 1001 and the lens group 1002. The holder 20, the optical component 60, and the photosensitive chip 1003 all are accommodated in a housing 80 of the lens actuating apparatus, and the photosensitive chip 1003 is fastened in the housing 80. A light incident hole 81 is disposed on the housing 80, and the first reflector 1001 faces the light incident hole 1001. Light entering from the light incident hole 81 is reflected by the first reflector 1001, and then passes through the lens group 1002, and is transmitted to the photosensitive chip 1003.

Figure 17:
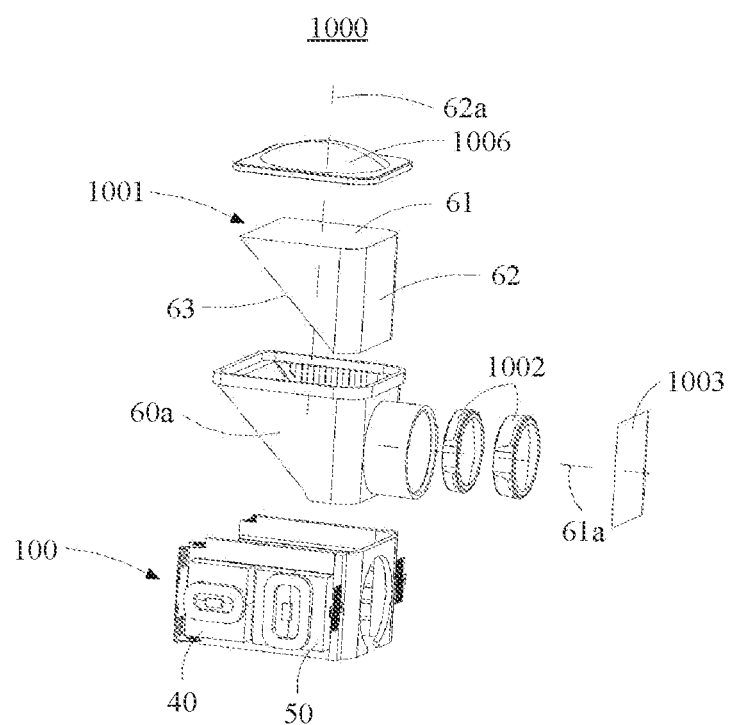
FIG. 17 is a schematic structural diagram of the periscope lens module according to the FIG. 16.

Referring to FIG. 17, in an embodiment of this application, a lens actuating apparatus in the periscope photographing module 1000 is the lens actuating apparatus 100 shown in FIG. 1. A translation motor 40 and an axis-moving motor 50 of the lens actuating apparatus 100 drive a first reflector 1001 and a lens group 1002 to move, to implement focusing or anti-shake. Specifically, the translation motor 40 drives the first reflector 1001 and the lens group 1002 to move along a direction parallel to a light emergent axis 62a, to change a distance between the lens group 1002 and a photosensitive chip 1003, so as to implement focusing. The axis-moving motor 50 drives the first reflector 1001 and the lens group 1002 to rotate around a rotation axis perpendicular to a first surface 21, so that a direction of an optical axis of the lens group 1002 is changed, to compensate for shake of the periscope photographing module 1000, thereby implementing anti-shake. It may be understood that, in another embodiment of this application, when the lens actuating apparatus in the periscope photographing module 1000 is the lens actuating apparatus 600 shown in FIG. 11 or the lens actuating apparatus 700 shown in FIG. 13, a translation direction in which the translation motor 40 drives a holder 20 to translate is the same as a direction that is of the rotation axis and in which the axis-moving motor 50 drives the holder 20 to rotate. Specifically, the translation motor 40 drives the first reflector 1001 and the lens group 1002 that are installed on the holder 20 to move along the direction perpendicular to the first surface 21, to change a position of the optical axis of the lens group 1002, and implement anti-shake along the direction perpendicular to the first surface 21. The axis-moving motor 50 drives the first reflector 1001 and the lens group 1002 to rotate around the rotation axis perpendicular to the first surface 21, so that a direction of an optical axis 64*a* is changed, and anti-shake along a direction parallel to the first surface 21 is implemented. Therefore, in this application, focusing and anti-shake or anti-shake in a multi-degree-of-freedom direction can be implemented by disposing different types of lens actuating apparatuses in the periscope photographing module 1000.

Referring to FIG. 16 and FIG. 17, in this embodiment, the first reflector 1001 is a triangular lens that is indirectly fastened to the holder 20. The triangular lens includes a light incident surface 61, a light emergent surface 62, and a reflective surface 63 that are connected to each other. The light incident surface 63 of the triangular lens is parallel to a light incident surface 61 of the optical component 60, and the light emergent surface 62 of the triangular lens is parallel to a light emergent surface 62 of the optical component 60. To be specific, the light emergent surface 62 of the triangular lens is perpendicular to the light incident surface 63 of the triangular lens. Both an included angle between the reflective surface 63 of the triangular lens and the light emergent surface 62 of the triangular lens, and an included angle between the reflective surface 63 of the triangular lens and the light incident surface 63 of the triangular lens are 45°, so that light incident from the light incident surface 63 is reflected by the reflective surface 63 and then is emitted from the light emergent surface 62. Specifically, the first reflector 1001 is first fastened to a mounting bracket 60*a*, and then the mourning bracket 60*a* is fastened in the holder 20. The lens group 1002 is also fastened to the mounting bracket 60*a* and is located at a position of the light emergent surface 62 of the first reflector 1001, so that the light reflected by the first reflector 1001 enters the lens group 1002. The lens group 1002 includes a plurality of lenses, and the light incident to the lens group 1002 is refracted by using the plurality of lenses in the lens group 1002, and then the light is projected onto the photosensitive chip 1003. The photosensitive chip 1003 is located at a position away from the first reflector 1001 relative to the lens group 1002, so that the light emitted from the lens group 1002 is projected onto the photosensitive chip to form an image. It may be understood that, in another embodiment, the first reflector 1001 and the lens group 1002 can alternatively be directly fastened in the holder 20.

Further, in some embodiments of this application, a planoconvex lens 1006 is stacked on the light incident surface 63 of the first reflector 1001. The planoconvex lens 1006 is configured to converge more external light on the periscope photographing module, to obtain a clearer image.

Figure 18:
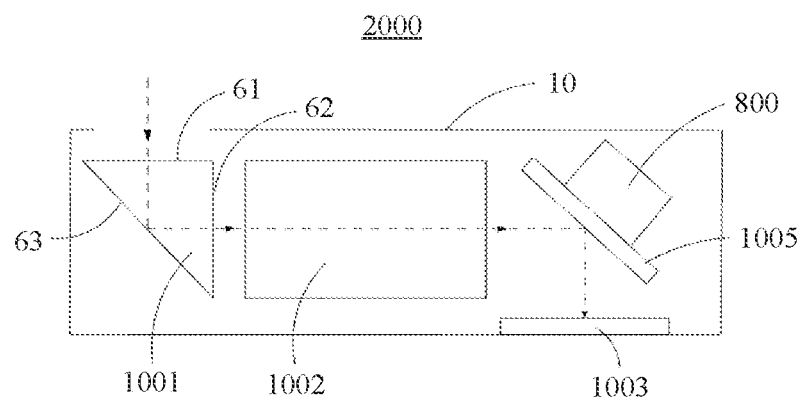
FIG. 18 is a schematic diagram of an imaging principle of a periscope lens module according to another embodiment of this application.

FIG. 18 shows another periscope photographing module 2000 according to this application. The periscope photographing module 2000 differs from the periscope photographing module 1000 in that one lens actuating apparatus is further disposed between a lens group 1002 and a photosensitive chip 1003, a second reflector 1005 is installed on the lens actuating apparatus between the lens group 1002 and the photosensitive chip 1003, and the second reflector 1005 is configured to reflect light passing through the lens group to the photosensitive chip 1003. In addition, focusing and anti-shake are jointly implemented through translation and rotation of the lens actuating apparatus 100 on which the second reflector 1005 is installed and a lens actuating apparatus 100 on which a first reflector 1001 is installed. It may be understood that the lens actuating apparatus on which the second reflector is installed may be the lens actuating apparatus in any one of the foregoing embodiments. In addition, in this embodiment, movement of any one of the lens actuating apparatus on which the first reflector 1001 is installed and the lens actuating apparatus on which the second reflector 1005 is installed is controlled, or movement jointly cooperated by the lens actuating apparatus on which the first reflector 1001 is installed and the lens actuating apparatus on which the second reflector 1005 is installed is controlled, so that focusing and anti-shake operations of the periscope photographing module 1000 can be implemented. In an embodiment of this application, the lens actuating apparatus on which the second reflector 1005 is installed is the lens actuating apparatus 800 shown in FIG. 14, and the second reflector 1005 is a planar reflector and has a single reflection plane.

Figure 19:
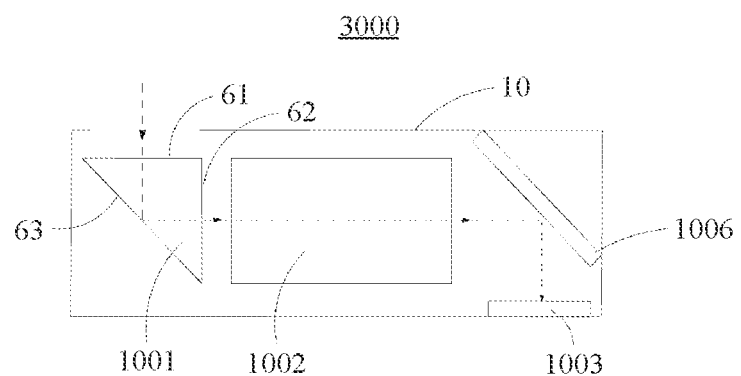
FIG. 19 is a schematic diagram of an imaging principle of a periscope lens module according to another embodiment of this application.

FIG. 19 shows a periscope photographing module 3000 according to another embodiment of this application. The periscope photographing module 3000 differs from the periscope photographing module 1000 in that one second reflector 1006 is further disposed between a lens group 1002 and a photosensitive chip 1003 of the periscope photographing module 3000, and the second reflector 1006 is fastened to a housing 10 of a lens actuating apparatus, that is, fastened relative to the photosensitive chip 1003, so that the second reflector 1006 reflects light passing through the lens group 1002 to the photosensitive chip 1003. In this way, a size of the periscope photographing module 3000 along a direction of an optical axis of the lens group 1002 is reduced.

Figure 20:
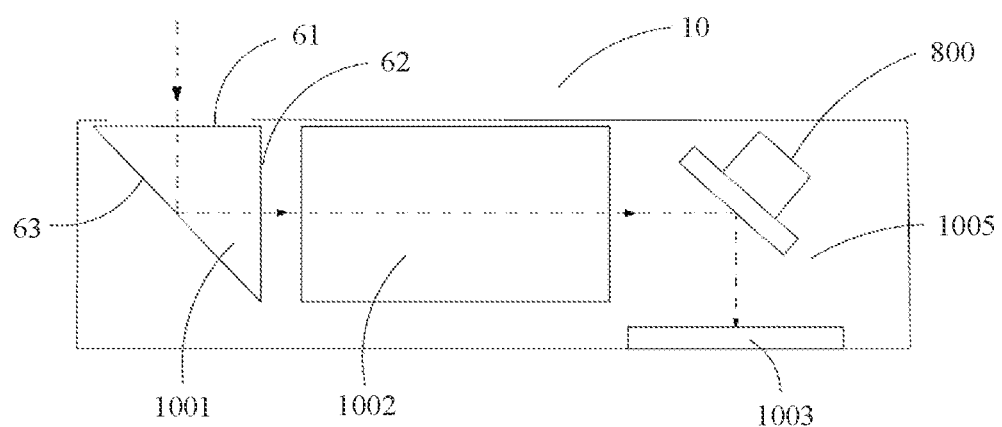
FIG. 20 is a schematic diagram of an imaging principle of a periscope lens module according to another embodiment of this application.

FIG. 20 shows a periscope photographing module 4000 according to another embodiment of this application. The periscope photographing module 4000 differs from the periscope photographing module 2000 in that the periscope photographing module 4000 includes only a lens actuating apparatus for fastening a second reflector 1005, a first reflector 1001, a lens group 1002, and a photosensitive chip 1003 are all fastened to a housing. To be specific, positions of the first reflector 1001, the lens group 1002, and the photosensitive chip 1003 are all relatively fastened. Movement of the lens actuating apparatus on which the second reflector 1005 is installed is controlled, to change a distance at which light is emitted from the lens group and is reflected to the photosensitive chip, or change an angle an optical axis 64*a* when the lens group reflects light to the photosensitive chip, so as to further implement focusing and anti-shake of the periscope lens module 4000.

This application further provides a photographing device. The photographing device includes a housing and a periscope photographing moduli, and the periscope photographing module is installed in the housing. A light incident hole is disposed on the housing, and light enters the periscope photographing module from the light incident hole. A control unit is further disposed inside the housing of the mobile terminal. In this embodiment, the control unit is a PCB and a control circuit is disposed on the PCB. A translation motor, an axis-moving motor, and a photosensitive chip all are electrically connected to the control unit, and the control unit is configured to receive and analyze an image of the photosensitive chip to determine a proper corrected motion value and send one or more electrical signals to a corresponding translation motor and/or a corresponding axis-moving motor, so that the translation motor and/or the axis-moving motor drive/drives a holder and an optical component installed on the holder to generate a corrective motion. In this embodiment, both coils of the translation motor and the axis-moving motor are connected to the control unit by using flexible printed circuit (FPC) boards. After receiving the image of the photosensitive chip to determine the proper corrected motion value, the control unit transmits a control signal to the coils of the translation motor and the axis-moving motor by using the flexible printed circuit (FPC) boards, to be specific, a value of a current transmitted to the coils is controlled, so as to control values of driving forces of different motors on the holder, and control the holder to drive the optical component located on the holder to move. In this way, focusing and axis moving of the periscope photographing module in the photographing device are implemented.

In this application, the periscope lens module is disposed in the photographing device, so that external light enters the lens group after being reflected, and the lens group can form an included angle with a light incident axis of the light incident hole. In this way, the direction of the optical axis of the lens group can be different from a thickness direction of the photographing device, to eliminate a limitation of a length of the direction of the optical axis of the lens group on a thickness of the photographing device, and implement thinness of the photographing device. Further, the translation motor and the axis-moving motor are disposed on the holder of the lens actuating apparatus, so that the translation motor is used to drive the optical component fastened to the holder to translate, so as to implement focusing and anti-shake of the periscope lens module including the optical component and the lens actuating apparatus. The axis-moving motor is used to drive the optical component fastened to the holder to rotate, to drive the optical component located on the holder to perform axis moving, so as to compensate for shake generated when the photographing module including the optical component and the lens actuating apparatus performs photographing, and implement anti-shake of the photographing module. In this application, the translation motor and the axis-moving motor are independent of each other, so that the translation motor and the axis-moving motor can work simultaneously, can further drive the holder to translate and rotate simultaneously, and can simultaneously implement focusing and anti-shake of the optical component installed on the holder. In this way, control efficiency is higher to quickly obtain a clear image. In addition, in this application, the holder can rotate through cooperation between the axis-moving motor and the elastic members, with no need to dispose motors pairwise symmetrically around the holder, and with no need to control different driving forces of relative motors to the holder to implement rotation. In this way, a quantity of motors disposed around the holder can be reduced, and a volume occupied by the lens actuating apparatus can be decreased. In addition, because the quantity of motors is reduced, control on the motors can also be simplified and the control efficiency can be improved.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A lens actuating apparatus, configured to drive an optical component fastened to the lens actuating apparatus to move or rotate, wherein the lens actuating apparatus comprises:
 a housing and a holder, wherein the holder is accommodated in the housing, wherein the optical component is fastened to the holder, and wherein the optical component is configured to change a propagation direction of light;
 a plurality of elastic members, wherein all of the plurality of elastic members are connected between the housing and the holder, and are disposed at intervals around a light incident axis of the optical component to support the holder in the housing; and
 a translation motor and an axis-moving motor, wherein both the translation motor and the axis-moving motor are located between the housing and the holder, and wherein the translation motor and the axis-moving motor each comprise a fastening part and a movable part that moves relative to the fastening part; and wherein:
 one of the fastening part and the movable part of the translation motor is fastened to the holder, the other of the fastening part and the movable part of the translation motor is fastened to the housing, and the translation motor is configured to drive the holder to move in a translation direction relative to the housing; and
 one of a driving part and the movable part of the axis-moving motor is fastened to the holder, the other of the driving and the movable of the axis-moving motor is fastened to the housing, the axis-moving motor is configured to cooperate with the plurality of elastic members to drive the holder to rotate around a rotation axis relative to the housing, and the rotation axis is parallel to the translation direction or perpendicular to the translation direction;
 wherein each of the elastic members is a two degree-of-freedom elastomer, wherein an elastic coefficient in a first direction is less than an elastic coefficient in a second direction or an elastic coefficient in a third direction, wherein the first direction, the second direction, and the third direction are respectively orthogonal, and wherein the translation direction of the holder is parallel to the first direction.

2. The lens actuating apparatus according to claim 1, wherein the lens actuating apparatus further comprises a plurality of position sensors, and wherein the position sensors one-to-one correspond to the axis-moving motor and the translation motor.

3. The lens actuating apparatus according to claim 1, wherein the optical component comprises a light incident surface and a light emergent surface that has an included angle with the light incident surface, wherein the light incident surface has a light incident axis perpendicular to the light incident surface, wherein the light emergent surface has a light emergent axis perpendicular to the light emergent surface, wherein the elastic member is sheet-shaped, and wherein the light incident axis is parallel to a plane on which the elastic members are located.

4. The lens actuating apparatus according to claim 3, wherein the light incident axis is perpendicular to the light emergent axis, wherein the translation direction is parallel to the light emergent axis, and wherein the rotation axis is perpendicular to both the light incident axis and the light emergent axis.

5. The lens actuating apparatus according to claim 4, wherein both the translation motor and the axis-moving motor are voice coil motors, wherein both the movable part of the translation motor and the movable part of the axis-moving motor are magnets and are fastened to the holder, wherein a direction from an N pole to an S pole of the movable part of the translation motor is the same as a direction of the light emergent axis, and wherein a direction from an N pole to an S pole of the movable part of the axis-moving motor is the same as a direction of the light incident axis.

6. The lens actuating apparatus according to claim 3, wherein the light incident axis is perpendicular to the light emergent axis, and wherein both the translation direction and a direction of the rotation axis are parallel to the light emergent axis.

7. The lens actuating apparatus according to claim 6, wherein both the translation motor and the axis-moving motor are voice coil motors, wherein both the movable part of the translation motor and the movable part of the axis-moving motor are magnets and are fastened to the holder, wherein a direction from an N pole to an S pole of the fastening part of the translation motor is the same as a direction of the light emergent axis, and wherein a direction from an N pole to an S pole of the fastening part of the axis-moving motor is the same as a direction of the light incident axis.

8. The lens actuating apparatus according to claim 4, wherein the holder comprises a first surface and a second surface that are disposed oppositely, and a third surface connected between the first surface and the second surface, wherein the third surface is far away from the light emergent surface of the optical component, wherein the axis-moving motors are symmetrically disposed on the first surface and the second surface, wherein the translation motor is located at the center of the third surface or the translation motors are symmetrically disposed on the first surface and the second surface, and wherein the translation motor and the axis-moving motor that are located on a same surface are arranged side by side along the direction of the light emergent axis.

9. The lens actuating apparatus according to claim 4, wherein the holder comprises a first surface and a second surface that are disposed oppositely, and a third surface connected between the first surface and the second surface, wherein the third surface is far away from the light emergent surface of the optical component, wherein the axis-moving motor is disposed at the center of the third surface, and wherein the translation motors are symmetrically disposed on the first surface and the second surface.

10. The lens actuating apparatus according to claim 8, wherein:
the plurality of elastic members are symmetrically disposed on the first surface and the second surface;
the elastic members disposed on the first surface and the second surface each comprise a translation elastic member and a common elastic member, both an elastic coefficient of the translation elastic member along the direction of the light emergent axis and an elastic coefficient of the translation elastic member along the direction of the rotation axis are less than an elastic coefficient of the translation elastic member along a direction of the light incident axis, an elastic coefficient of the common elastic member along the direction of the rotation axis is greater than an elastic coefficient of the common elastic member along the direction of the light incident axis and an elastic coefficient of the common elastic member along the direction of the light emergent axis, and an elastic coefficient of the common elastic member along a direction parallel to the rotation axis is greater than an elastic coefficient of the translation motor along the direction parallel to the rotation axis; and
the translation elastic member and the common elastic member are respectively disposed on two sides of the first surface and the second surface along the direction of the light emergent axis, the translation elastic member is far away from the third surface relative to the common elastic member, and the common elastic member is close to the third surface relative to the translation elastic member.

11. The lens actuating apparatus according to claim 10, wherein the translation elastic member and the common elastic member each comprise a plurality of etched arms that are disposed at intervals and head-to-tail connected, wherein an extension direction of an etched arm of the translation elastic member is parallel to the light incident axis, and wherein an extension direction of an etched arm of the common elastic member is perpendicular to the first surface.

12. The lens actuating apparatus according to claim 9, wherein:
the plurality of elastic members are respectively located on two sides of the first surface and the second surface along a direction parallel to the light emergent axis; and
both an elastic coefficient of the elastic member along the direction of the light emergent axis and an elastic coefficient of the elastic member along a direction of the light incident axis are less than an elastic coefficient of the elastic member along a direction perpendicular to the light emergent axis and the light incident axis.

13. The lens actuating apparatus according to claim 12, wherein each of the elastic members comprises a plurality of etched arms that are disposed at intervals and head-to-tail connected, and wherein an extension direction of the etched arm is perpendicular to the light incident axis and the light emergent axis.

14. The lens actuating apparatus according to claim 5, wherein the magnet comprises 2×n sub-magnets adjacently arranged side by side, wherein n is a natural number greater than 0, wherein N poles or S poles of adjacent sub-magnets are opposite, wherein each magnet is fastened with a position sensor, and wherein the position sensor is located at a junction of two sub-magnets at the center of the magnet.

15. The lens actuating apparatus according to claim 5, wherein the magnet is a single magnet, wherein a magnetic field direction of an N pole is opposite to a magnetic field direction of an S pole, wherein a position sensor is fastened on the housing and faces a side face of the magnet, and wherein the side face of the magnet is perpendicular to the direction towards which the N pole of the magnet faces and the direction towards which the S pole of the magnet faces.

16. The lens actuating apparatus according to claim 1, wherein the optical component comprises a single reflection plane and has a single optical axis, wherein the elastic member is sheet-shaped, and wherein the optical axis is perpendicular to a plane on which the elastic members are located.

17. The lens actuating apparatus according to claim 16, wherein the translation direction is parallel to a direction of the optical axis, and wherein the direction of the rotation axis is perpendicular to the translation direction.

18. A periscope photographing module, comprising a first reflector, a lens group, a photosensitive chip, and a lens actuating apparatus, wherein the lens actuating apparatus is configured to drive an optical component fastened to the lens actuating apparatus to move or rotate, and wherein the lens actuating apparatus comprises:
a housing and a holder, wherein the holder is accommodated in the housing, wherein the optical component is fastened to the holder, and wherein the optical component is configured to change a propagation direction of light;

a plurality of elastic members, wherein all of the plurality of elastic members are connected between the housing and the holder, and are disposed at intervals around a light incident axis of the optical component to support the holder in the housing; and
a translation motor and an axis-moving motor, wherein both the translation motor and the axis-moving motor are located between the housing and the holder, and wherein the translation motor and the axis-moving motor each comprise a fastening part and a movable part that moves relative to the fastening part; and wherein:
one of the fastening part and the movable part of the translation motor is fastened to the holder, the other of the fastening part and the movable part of the translation motor is fastened to the housing, and the translation motor is configured to drive the holder to move in a translation direction relative to the housing; and
one of a driving part and the movable part of the axis-moving motor is fastened to the holder, the other of the driving and the movable of the axis-moving motor is fastened to the housing, the axis-moving motor is configured to cooperate with the plurality of elastic members to drive the holder to rotate around a rotation axis relative to the housing, and the rotation axis is parallel to the translation direction or perpendicular to the translation direction;
wherein each of the elastic members is a two degree-of-freedom elastomer, wherein an elastic coefficient in a first direction is less than an elastic coefficient in a second direction or an elastic coefficient in a third direction, wherein the first direction, the second direction, and the third direction are respectively orthogonal, and wherein the translation direction of the holder is parallel to the first direction; and
wherein both the first reflector and the lens group are installed on the holder of the lens actuating apparatus, wherein after being reflected by the first reflector, light passes through the lens group and is transmitted to the photosensitive chip, and wherein the translation motor and the axis-moving motor drive the first reflector and the lens group to move to implement focusing or anti-shake.

19. A photographing device, comprising a housing, a controller, and a periscope photographing module, wherein the periscope photographing module comprises a first reflector, a lens group, a photosensitive chip, and a lens actuating apparatus, wherein the lens actuating apparatus is configured to drive an optical component fastened to the lens actuating apparatus to move or rotate, and wherein the lens actuating apparatus comprises:
the housing and a holder, wherein the holder is accommodated in the housing, wherein the optical component is fastened to the holder, and wherein the optical component is configured to change a propagation direction of light;
a plurality of elastic members, wherein all of the plurality of elastic members are connected between the housing and the holder, and are disposed at intervals around a light incident axis of the optical component to support the holder in the housing; and
a translation motor and an axis-moving motor, wherein both the translation motor and the axis-moving motor are located between the housing and the holder, and wherein the translation motor and the axis-moving motor each comprise a fastening part and a movable part that moves relative to the fastening part; and wherein:
one of the fastening part and the movable part of the translation motor is fastened to the holder, the other of the fastening part and the movable part of the translation motor is fastened to the housing, and the translation motor is configured to drive the holder to move in a translation direction relative to the housing; and
one of a driving part and the movable part of the axis-moving motor is fastened to the holder, the other of the driving and the movable of the axis-moving motor is fastened to the housing, the axis-moving motor is configured to cooperate with the plurality of elastic members to drive the holder to rotate around a rotation axis relative to the housing, and the rotation axis is parallel to the translation direction or perpendicular to the translation direction;
wherein both the first reflector and the lens group are installed on the holder of the lens actuating apparatus, wherein after being reflected by the first reflector, light passes through the lens group and is transmitted to the photosensitive chip, and wherein the translation motor and the axis-moving motor drive the first reflector and the lens group to move to implement focusing or anti-shake;
wherein each of the elastic members is a two degree-of-freedom elastomer, wherein an elastic coefficient in a first direction is less than an elastic coefficient in a second direction or an elastic coefficient in a third direction, wherein the first direction, the second direction, and the third direction are respectively orthogonal, and wherein the translation direction of the holder is parallel to the first direction;
wherein the periscope photographing module is installed in the housing;
wherein a light incident hole is disposed on the housing, light enters the periscope photographing module by using the light incident hole, an optical axis of a lens group of the periscope photographing module crosses an axis of the light incident hole, and the first reflector is located between the light incident hole and the lens group, and is configured to reflect the light entering by using the light incident hole to the lens group; and
wherein the translation motor, the axis-moving motor, and the photosensitive chip all are electrically connected to the controller, and the controller is configured to receive and analyze an image of the photosensitive chip to determine a proper corrected motion value and send a signal to at least one of a corresponding translation motor or a corresponding axis-moving motor, wherein at least one of the translation motor or the axis-moving motor drives the holder and the optical component installed on the holder to at least one of translate or rotate.

* * * * *

UNITED STATES PATENT AND TRADEMARK OFFICE
CERTIFICATE OF CORRECTION

PATENT NO. : 11,487,079 B2
APPLICATION NO. : 17/207345
DATED : November 1, 2022
INVENTOR(S) : Li-Te Kuo, Yushun Wu and Kuni Lee It is certified that error appears in the above-identified patent and that said Letters Patent is hereby corrected as shown below:

In the Specification

In Column 1, In Line 8, delete "international" and insert -- International --.

Signed and Sealed this
Second Day of May, 2023

Katherine Kelly Vidal
*Director of the United States Patent and Trademark Office*